US012786555B2

(12) United States Patent
Yamasaki et al.

(10) Patent No.: US 12,786,555 B2

(45) Date of Patent: Nov. 3, 2026

(54) IMAGING APPARATUS

(71) Applicant: Panasonic Intellectual Property Management Co., Ltd., Osaka (JP)

(72) Inventors: Takaaki Yamasaki, Osaka (JP); Shinichi Yamamoto, Osaka (JP); Norikazu Kaneda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 69 days.

(21) Appl. No.: 18/903,665

(22) Filed: Oct. 1, 2024

(65) Prior Publication Data

US 2025/0119639 A1 Apr. 10, 2025

(30) Foreign Application Priority Data

Oct. 6, 2023 (JP) ................................ 2023-174598
Jul. 25, 2024 (JP) ................................ 2024-120254

(51) Int. Cl.

*H04N 23/60* (2023.01)
*H04N 23/52* (2023.01)
*H04N 23/62* (2023.01)
*H04N 23/63* (2023.01)

(52) U.S. Cl.

CPC ............ *H04N 23/64* (2023.01); *H04N 23/52* (2023.01); *H04N 23/62* (2023.01); *H04N 23/634* (2023.01)

(58) Field of Classification Search

CPC .... H04N 23/64; H04N 23/634; H04N 23/667; H04N 23/633; H04N 23/52; H04N 23/62
See application file for complete search history.

(56) References Cited

U.S. PATENT DOCUMENTS

| | | | | |
|---|---|---|---|---|
| 10,809,486 | B2 * | 10/2020 | Hosoe .................... | H04N 23/60 |
| 2019/0154949 | A1 | 5/2019 | Hosoe et al. | |
| 2020/0288048 | A1 | 9/2020 | Makara et al. | |
| 2021/0297586 | A1 | 9/2021 | Imai et al. | |
| 2022/0338379 | A1 | 10/2022 | Momose et al. | |
| 2024/0205526 | A1 * | 6/2024 | Ueda ...................... | G01K 13/00 |
| 2025/0106490 | A1 * | 3/2025 | Kaneda ................ | H04N 23/531 |

FOREIGN PATENT DOCUMENTS

| | | | |
|---|---|---|---|
| JP | 2019-095564 | A | 6/2019 |
| JP | 2019-191433 | A | 10/2019 |
| JP | 2020-145510 | A | 9/2020 |
| JP | 2021-150784 | A | 9/2021 |
| JP | 2022-164307 | A | 10/2022 |
| JP | 2022-183847 | A | 12/2022 |

* cited by examiner

*Primary Examiner* — Kelly L Jerabek

(74) *Attorney, Agent, or Firm* — Renner, Otto, Boisselle & Sklar, LLP

(57) ABSTRACT

An imaging apparatus comprises: an image sensor configured to shoot a subject image through an optical system and generate image data; a connector configured to detachably attach a heat dissipation unit; a controller configured to detect whether the heat dissipation unit is attached to the connector; and a notification unit configured to notify a user of information. The controller causes the notification unit to notify an available shooting time of a moving image according to whether the heat dissipation unit is attached to the connector.

15 Claims, 18 Drawing Sheets

*Fig.6*

| SHOOTING MODE | ENVIRONMENTAL TEMP. Te | SENSOR TEMP. Ts | PRESENCE OR ABSENCE OF ATTACHMENT OF HEAT DISSIPATION UNIT/ HEAT DISSIPATION CAPACITY | | | |
|---|---|---|---|---|---|---|
| | | | NOT ATTACHED | ATTACHED/LOW | ATTACHED/MEDIUM | ATTACHED/HIGH |
| 4K120P | 40℃ | 60℃ | NOT OPERABLE | NOT OPERABLE | NOT OPERABLE | 10 MIN |
| | | 40℃ | NOT OPERABLE | NOT OPERABLE | 10 MIN | 40 MIN |
| | 25℃ | 40℃ | NOT OPERABLE | NOT OPERABLE | 10 MIN | 40 MIN |
| | | 25℃ | 30 MIN | 40 MIN | 60 MIN | INFINITE-TIME OPERABLE |
| 4K60P | 40℃ | 60℃ | NOT OPERABLE | NOT OPERABLE | 10 MIN | 40 MIN |
| | | 40℃ | 20 MIN | 30 MIN | 60 MIN | INFINITE-TIME OPERABLE |
| | 25℃ | 40℃ | 20 MIN | 30 MIN | 60 MIN | INFINITE-TIME OPERABLE |
| | | 25℃ | 40 MIN | 60 MIN | INFINITE-TIME OPERABLE | INFINITE-TIME OPERABLE |
| 4K30P | 40℃ | 60℃ | 20 MIN | 30 MIN | 60 MIN | INFINITE-TIME OPERABLE |
| | | 40℃ | 60 MIN | INFINITE-TIME OPERABLE | INFINITE-TIME OPERABLE | INFINITE-TIME OPERABLE |
| | 25℃ | 40℃ | 60 MIN | INFINITE-TIME OPERABLE | INFINITE-TIME OPERABLE | INFINITE-TIME OPERABLE |
| | | 25℃ | INFINITE-TIME OPERABLE | INFINITE-TIME OPERABLE | INFINITE-TIME OPERABLE | INFINITE-TIME OPERABLE |

*Fig. 12A*

134

☐EXTERNAL HEAT DISSIPATION UNIT IS ATTACHED. 134a

☐ CURRENTLY SET SHOOTING MODE ALLOWS FOR 15 MIN OF CONTINUOUS SHOOTING. 134b

☐ RECOMMENDED EXAMPLES FOR SHOOTING FOR MORE THAN 20 MIN ARE (1), (2) AND (3). 134c (1) CHANGE TO HEAT DISSIPATION UNIT (TYPE B: FAN)
+ USE CURRENT SHOOTING MODE (4k60p)
--> EXPANDABLE TO 40 MIN (AT MAX. PERFORMANCE)

(2) CHANGE TO HEAT DISSIPATION UNIT (TYPE B: FAN)
+ USE SHOOTING MODE (4k120p)
--> EXPANDABLE TO 25 MIN (AT MAX. PERFORMANCE)

(3) CHANGE TO HEAT DISSIPATION UNIT (TYPE C: FIN WITH PELTIER) + USE CURRENT SHOOTING MODE (4k60p)
--> EXPANDABLE TO 20 MIN (AT MAX. PERFORMANCE)

*Fig. 12B*

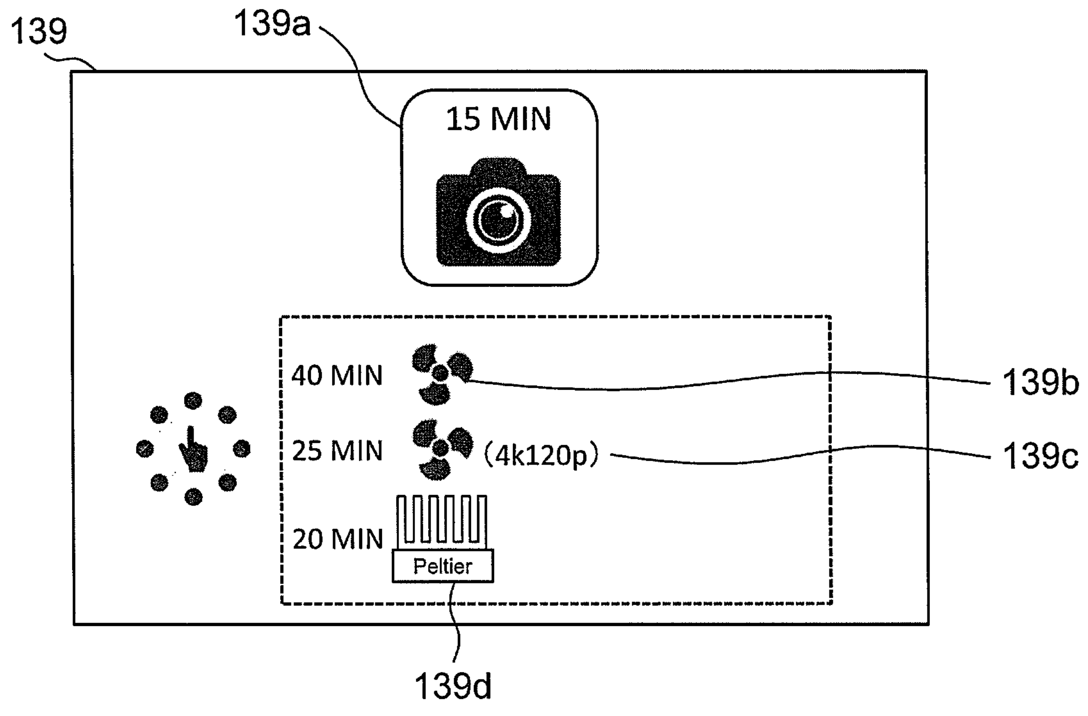

IMAGING APPARATUS

CROSS REFERENCE TO RELATED APPLICATION

This application claims priority to Japanese Patent Application 2023-174598 filed on Oct. 6, 2023, and Japanese Patent Application 2024-120254 filed on Jul. 25, 2024, each of the contents of which is incorporated herein by reference.

BACKGROUND

Technical Field

The present disclosure relates to an imaging apparatus.

Background Art

JP 2019-095564 A discloses a camera system capable of detachably attaching a heat dissipation module to an imaging apparatus.

SUMMARY

The present disclosure provides an imaging apparatus in which user convenience at the time of shooting a moving image is improved with respect to an available shooting time.

An imaging apparatus according to one aspect of the present disclosure includes: an image sensor configured to shoot a subject image through an optical system and generate image data; a connector configured to detachably attach a heat dissipation unit; a controller configured to detect whether the heat dissipation unit is attached to the connector; and a notification unit configured to notify a user of information. The controller causes the notification unit to notify an available shooting time of a moving image according to whether the heat dissipation unit is attached.

An imaging apparatus according to another aspect of the present disclosure includes: an image sensor configured to shoot a subject image through an optical system and generate image data; a connector configured to detachably attach a heat dissipation unit; a controller configured to detect whether the heat dissipation unit is attached to the connector; a notification unit configured to notify a user of information; and an operation member configured to receive a user operation of specifying a shooting time of a moving image desired by the user. When the shooting time is specified through the operation member, the controller causes the notification unit to notify information indicating at least one of a shooting mode that enables shooting of the moving image over the shooting time or the heat dissipation unit.

According to the present disclosure, it is possible to provide an imaging apparatus in which user convenience at the time of shooting a moving image is improved with respect to an available shooting time.

BRIEF DESCRIPTION OF DRAWINGS

FIG. 6 is a table showing an example of the available shooting-time table;

FIG. 12A is a view showing an example of a display screen in the second embodiment;

FIG. 12B is a view showing an example of a display screen in the second embodiment;

DETAILED DESCRIPTION

Hereinafter, embodiments will be described with reference to the drawings as appropriate. However, a detailed description more than necessary may be omitted. It should be noted that the accompanying drawings and the following description are provided for those skilled in the art to fully understand the present disclosure and are not intended to limit the claimed subject matter by these.

1. First Embodiment

1-1. Configuration

Figure 1:
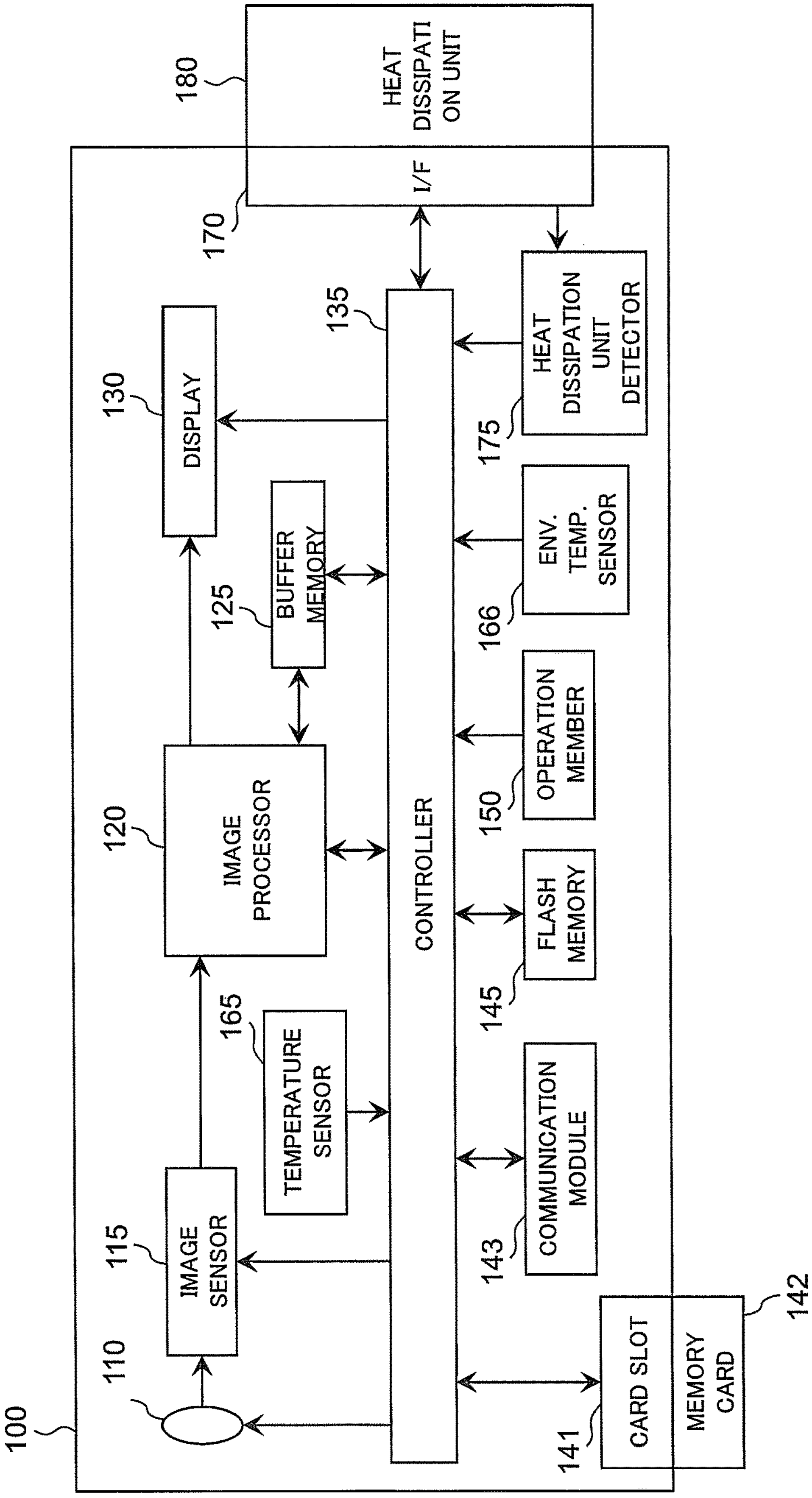
FIG. 1 is a block diagram showing a configuration example of a camera system according to a first embodiment.

FIG. 1 is a block diagram showing a configuration example of a camera system according to a first embodiment of the present disclosure. The camera system includes a digital camera 100 and a heat dissipation unit 180 configured to be attachable to and detachable from the digital camera 100. The digital camera 100 captures a subject image to generate image data. The image data generated by the digital camera 100 includes moving image data and still image data.

The digital camera 100 captures a subject image formed through an optical system 110 with an image sensor 115 to generate original image data (RAW data). The image processing unit 120 performs various types of processing on the RAW data generated by the image sensor 115 to generate image data. The controller 135 records the image data generated in the image processing unit 120 in a flash memory 145 or a memory card 142 mounted on a card slot 141. In addition, the controller 135 can display (reproduce) the image data recorded in the flash memory 145 or the memory card 142 on the display 130 according to the operation of the operation member 150 by the user.

The optical system 110 includes a focus lens, a zoom lens, an optical image stabilization lens (OIS), a diaphragm, a shutter, and the like. The various lenses included in the optical system 110 may include any number of lenses or any number of groups.

The image sensor 115 captures a subject image formed through the optical system 110 to generate RAW data. The image sensor 115 generates image data of a new frame at a predetermined frame rate (for example, 30 frames/second). The generation timing of the RAW data and the electronic shutter operation in the image sensor 115 are controlled by the controller 135. It should be noted that, as the image sensor 115, various image sensors such as a CMOS image sensor, a CCD image sensor, or an NMOS image sensor may be used. The image sensor 115 is an example of an imaging unit in the present embodiment.

The image processing unit 120 performs various types of processing on the RAW data output from the image sensor 115 to generate image data. In addition, the image processing unit 120 performs various types of processing on the image data read from the memory card 142 to generate an image for being displayed on the display 130. The various types of processing include white balance correction, gamma correction, YC conversion processing, electronic zoom processing, compression processing, expansion processing, and the like, but are not limited to these. The image processing unit 120 may include a hard-wired electronic circuit or a microcomputer or the like using programs.

The display 130 is a display apparatus such as a liquid crystal display or an organic EL display capable of displaying information. For example, the display 130 displays an image based on the image data processed by the image processing unit 120. In addition, the display 130 displays a menu screen for the user to check the setting of the digital camera 100. The display 130 is an example of a notification unit capable of notifying the user of information.

The controller 135 controls the operation of the entire digital camera 100. The controller 135 may include a processor configured to implement a predetermined function by executing a program. For example, the controller 135 can be implemented by various processors such as a CPU, an MPU, a GPU, a DSU, an FPGA, and an ASIC. The controller 135 may include one or more processors. In addition, the controller 135 may include one semiconductor chip together with the image processing unit 120 and the like. Although not shown, the controller 135 incorporates a ROM. The ROM stores various programs such as autofocus control (AF control) executed by the controller 135. In addition, the controller 135 incorporates a RAM (not shown) that functions as a work area of the CPU.

The buffer memory 125 is a recording medium that functions as a work memory of the image processing unit 120 and the controller 135. The buffer memory 125 is implemented with a dynamic random access memory (DRAM) or the like.

The card slot 141 is detachably inserted with the memory card 142. The card slot 141 can be electrically and mechanically connected to the memory card 142. The memory card 142 is an external memory including a recording element such as a flash memory inside. The memory card 142 can store data such as image data generated by the image processing unit 120.

The communication module 143 performs data communication according to an existing wired communication standard or wireless communication standard. For example, the digital camera 100 can communicate with a communication network such as the Internet and/or another apparatus or the like mounted with a Wi-Fi module through the communication module 143. The digital camera 100 may communicate directly with other apparatuses through the communication module 143, or may communicate via an access point.

The flash memory 145 is a nonvolatile recording medium. The flash memory 145 can store various data such as image data, an available shooting-time table to be described below, and display data.

The operation member 150 is a general term for a user interface such as a hardware key and a software key of the digital camera 100, and receives an operation by a user. The operation member 150 includes, for example, a button, a mode dial, a touch panel, and a switch. When receiving an operation by the user, the operation member 150 transmits an operation signal corresponding to the user operation to the controller 135.

The operation member 150 includes various buttons such as an information display switching button, a menu/setting button, a return button, a decision button, and a cursor button. The cursor buttons include respective depression buttons corresponding to up, down, left, and right, and when the cursor buttons are depressed by the user, a selection area displayed on the display 130, a cursor, and the like can be moved. The operations by these various buttons may be configured to be executable not only by physical buttons but also by a touch panel.

The temperature sensor 165 measures the temperature of the image sensor 115. The controller 135 acquires temperature data of the image sensor 115 measured by the temperature sensor 165. Alternatively, when the temperature sensor 165 is a thermistor, the controller 135 may obtain a voltage value that is a measurement result from the temperature sensor 165 and determine the temperature data based on the voltage value. The environmental temperature sensor 166 measures an environmental temperature around the digital camera 100. The environmental temperature sensor 166 is provided, for example, near the exterior of the digital camera 100.

The heat dissipation unit 180 is a member or an apparatus for dissipating the heat of the digital camera 100. The heat dissipation unit interface (I/F) 170 is an example of a connector for connecting the heat dissipation unit 180 and the digital camera 100. The heat dissipation unit I/F 170 is, for example, an interface member, a terminal, or a circuit.

Figure 2:
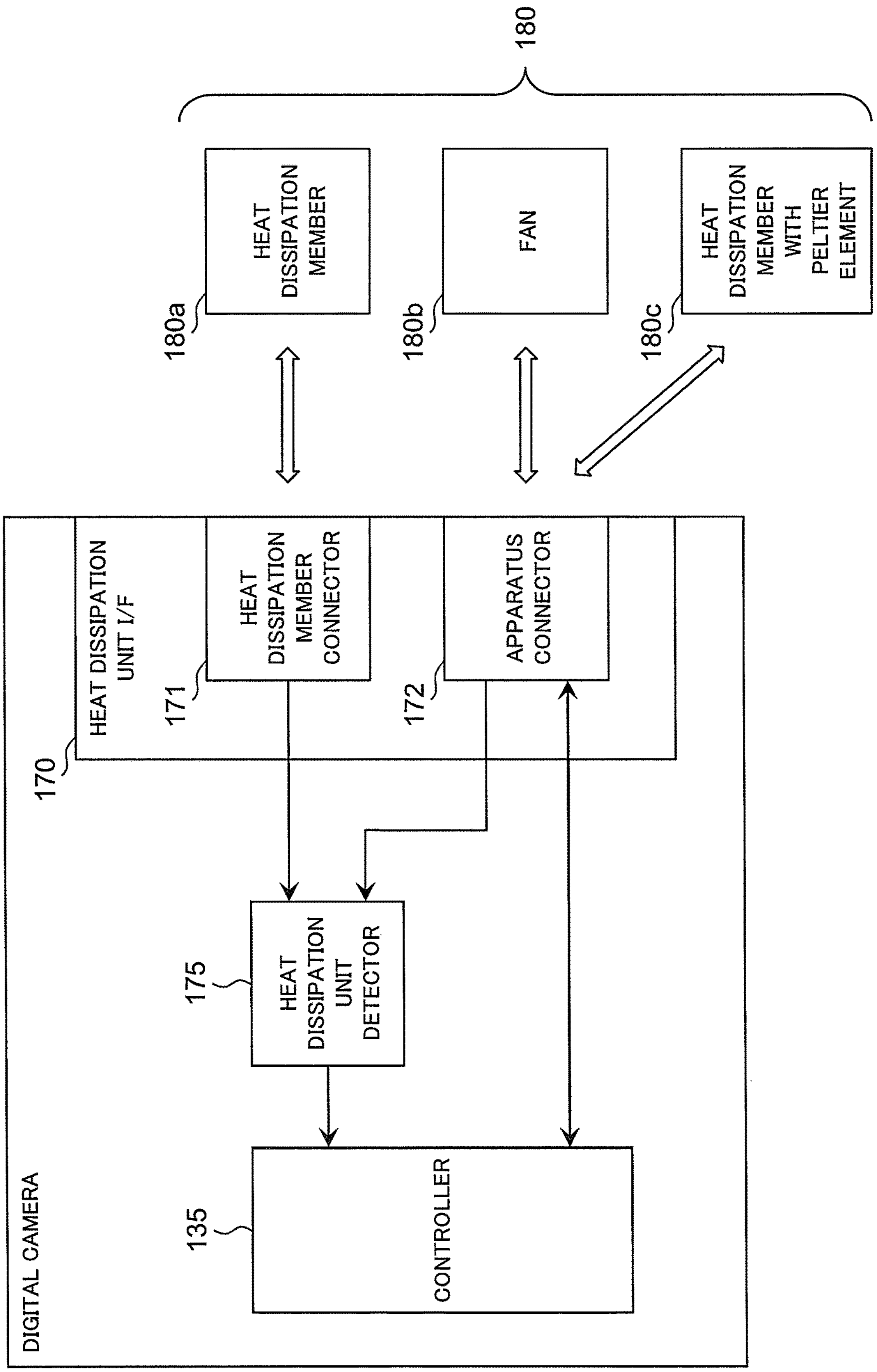
FIG. 2 is a block diagram illustrating the heat dissipation unit, and the heat dissipation unit I/F of the digital camera, in FIG. 1.

FIG. 2 is a block diagram illustrating the heat dissipation unit 180 and the heat dissipation unit I/F 170 of the digital camera 100. The heat dissipation unit 180 includes, for example, a heat dissipation member **180*a*, a fan 180*b*, and a heat dissipation member 180*c*** with a Peltier element.

The heat dissipation unit I/F 170 of the digital camera 100 is configured to be able to connect at least two of the heat dissipation member **180*a*, the fan 180*b*, and the heat dissipation member 180*c* with a Peltier element. These may be connected to the heat dissipation unit I/F 170 at the same time, or may be connected to the heat dissipation unit I/F 170** one by one in a replaceable manner.

The heat dissipation member **180*a* is an example of a first type (referred to as type A) heat dissipation unit having fixed heat dissipation capacity, and is, for example, a member such as a fin or a heat sink. The heat dissipation member 180***a* contains a metal having high thermal conductivity, for example, a metal such as copper or aluminum. The heat dissipation member 180*a* is detachably connected to the heat dissipation member connector 171 of the heat dissipation unit I/F 170. To the heat dissipation member connector 171, another heat dissipation member different in heat dissipation capacity, for example, a volume, a surface area, a material, or the like from the heat dissipation member 180*a* may be connected.

The fan 180*b* is an apparatus that air-cools the digital camera 100 by blowing air. The fan 180*b* includes, for example, a processing device such as a CPU, a memory, a power supply, and a rotatable blade. The fan 180*b* may be configured to cool a heat dissipation member such as a fin with a rotating blade. The fan 180*b* may include a temperature sensor. The fan 180*b* may be configured to be able to change the heat dissipation capacity by changing the rotational speed of the blade. The memory of the fan 180*b* stores identification information for identifying the fan 180*b*, information indicating the current heat dissipation capacity, and the like.

The fan 180*b* includes a connector, and is detachably connected to an apparatus connector 172 of the heat dissipation unit I/F 170 through the connector. To the apparatus connector 172, another fan different in heat dissipation capacity from the fan 180*b* may be connected.

The heat dissipation member 180*c* includes a Peltier element in addition to the same configuration as the heat dissipation member 180*a*. The heat dissipation member 180*c* includes, for example, a fin and a Peltier element, and is configured so that a cooling surface of the Peltier element is in contact with the fin. The Peltier element of the heat dissipation member 180*c* includes a connector, and the connector of the Peltier element is detachably connected to the apparatus connector 172 of the heat dissipation unit I/F 170. The heat dissipation member 180*c* may further include a fan that cools the heat generation surface of the Peltier element by blowing air. The heat dissipation member 180*c* may include a cooling device such as a water cooling device instead of the Peltier element.

The fan 180*b* and the heat dissipation member 180*c* are examples of a second-type heat dissipation unit whose heat dissipation capacity can be changed. Here, the fan 180*b* is referred to as a type-B heat dissipation unit, and the heat dissipation member 180*c* is referred to as a type-C heat dissipation unit.

A heat-dissipation-unit detector 175 of the digital camera 100 detects whether the heat dissipation unit 180 is attached to the heat dissipation unit I/F 170. In addition, when the heat dissipation unit 180 is attached to the heat dissipation unit I/F 170, the heat-dissipation-unit detector 175 detects the type (heat dissipation method) and the heat dissipation capacity using identification information (model information) of the heat dissipation unit 180 connected to the heat dissipation unit I/F 170. In the example in FIG. 2, the heat-dissipation-unit detector 175 detects which of the heat dissipation member 180*a*, the fan 180*b*, and the fan 180*c* is connected to the heat dissipation unit I/F 170.

Hereinafter, an example of a method for detecting the type (heat dissipation method) and heat dissipation capacity of the heat dissipation unit 180 by the heat-dissipation-unit detector 175 will be described.

For example, when the heat dissipation member 180*a* includes a memory that stores identification information (information indicating a heat dissipation method and heat dissipation capacity) such as a model of the heat dissipation member 180*a* and an electronic contact, and the heat dissipation member 180*a* is connected to the heat dissipation member connector 171, the identification information is transmitted to the heat-dissipation-unit detector 175 through the electronic contact. Accordingly, the heat-dissipation-unit detector 175 can detect whether the heat dissipation member 180*a* is connected to the heat dissipation member connector 171 and the model (heat dissipation method and heat dissipation capacity) of the connected heat dissipation member 180*a*.

Alternatively, the heat dissipation member 180*a* may have a structure such as a detection hole, unevenness, or a groove, and the heat dissipation member connector 171 may include a detection switch that detects the structure. The heat-dissipation-unit detector 175 can detect the model (heat dissipation method and heat dissipation capacity) of the heat dissipation member 180*a* connected to the heat dissipation member connector 171 based on the structure detected by the detection switch.

When the fan 180*b* is attached, the apparatus connector 172 acquires, for example, data such as identification information stored in a memory of the fan 180*b*, and transmits the acquired data to the heat-dissipation-unit detector 175. Accordingly, the heat-dissipation-unit detector 175 can detect whether the fan 180*b* is connected to the apparatus connector 172 and the model of the connected fan 180*b*. The same applies to the heat dissipation member 180*c* with a Peltier element.

When it is confirmed that the second-type heat dissipation unit (the fan 180*b* and the heat dissipation member 180*c* with a Peltier element in the above example) is attached to the heat dissipation unit I/F 170, the controller 135 can control the second-type heat dissipation capacity according to the shooting condition. For example, the controller 135 can change the heat dissipation capacity of the fan 180*b* by changing the rotational speed of the blade of the fan 180*b*. In addition, for the heat dissipation member 180*c* with a Peltier element, the controller 135 can control the heat dissipation capacity of the heat dissipation member 180*c* by switching the ON/OFF cycle of feed to the Peltier element, or the like.

1-2. Operation 1-2-1. Overall Operation

Figure 3:
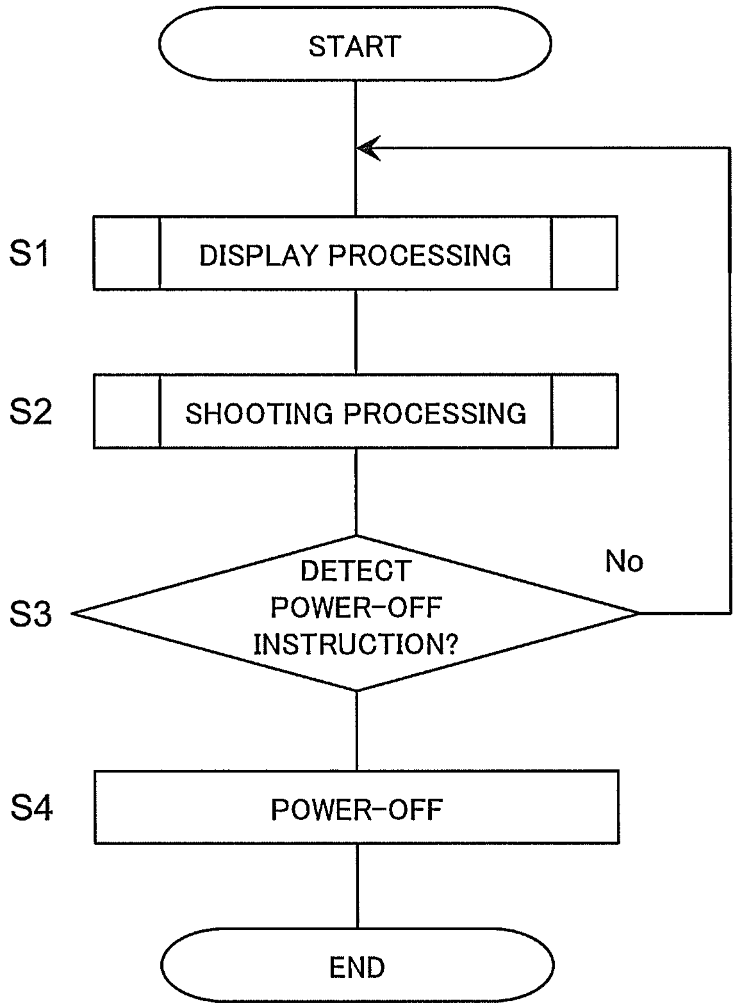
FIG. 3 is a flowchart illustrating the operation of the digital camera.

The operation of the digital camera 100 configured as described above will be described in the following. FIG. 3 is a flowchart illustrating an operation of the digital camera 100. The operation shown in FIG. 3 is executed by the controller 135, for example, when the power of the digital camera 100 is turned on.

As shown in FIG. 3, the controller executes display processing S1 and shooting processing S2, and if detecting a power-off instruction input by the user through the operation member 150 (Yes in S3), the controller 135 executes power-off operation S4. The operation shown in FIG. 3 is ended by the power-off operation. Alternatively, the display processing S1 and the shooting processing S2 shown in FIG. 3 may be periodically executed at the time of the power-on of the digital camera 100.

1-2-2. Display Processing

Figure 4:
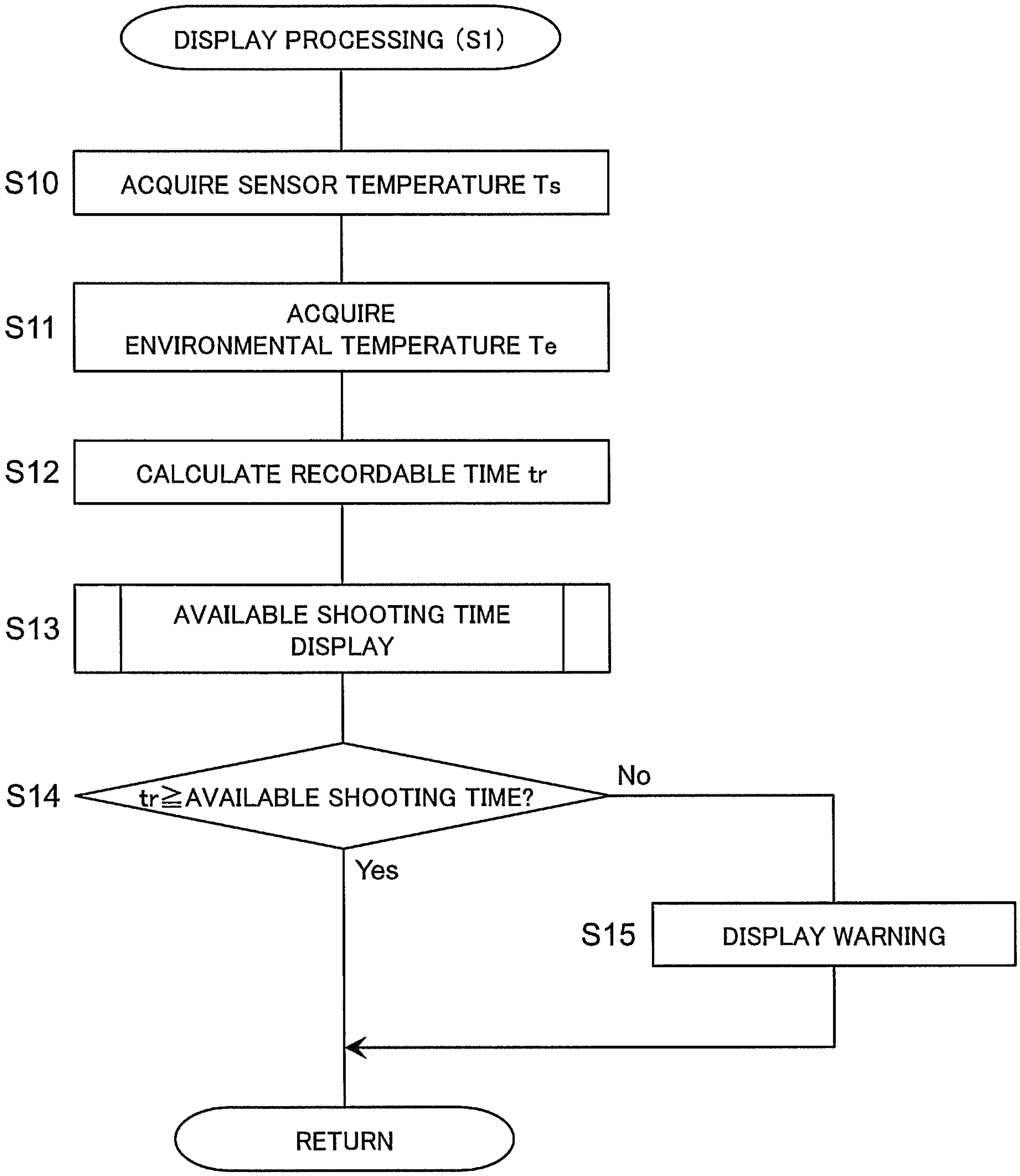
FIG. 4 is a flowchart illustrating the display processing shown in FIG. 3.

FIG. 4 is a flowchart illustrating the display processing S1 shown in FIG. 3. In the display processing S1 in FIG. 4, the controller 135 acquires the sensor temperature Ts indicating the temperature of the image sensor 115 measured by the temperature sensor 165 from the temperature sensor 165 (S10).

In addition, the controller 135 acquires the environmental temperature Te measured by the environmental temperature sensor 166 from the environmental temperature sensor 166 (S11).

The controller 135 calculates the recordable time tr of the moving image data by the digital camera 100 based on a state of a free space or the like of a recording medium such as the flash memory 145 and the memory card 142 (S12).

Steps S10 to S12 are in random order, and may be executed in an order different from that in FIG. 4. In addition, step S12 may be executed after the available shooting time display processing S13 described below.

Using the sensor temperature Ts and the environmental temperature Te respectively obtained in steps S10 and S11, the controller 135 determines an available shooting time of the moving image and displays the available shooting time on the display 130 (S13).

The available shooting time is a time during which shooting of a moving image can be continued under a set condition. In the present embodiment, the available shooting time is defined according to a condition related to temperature. For example, the available shooting time is an estimated time from the shooting start time of the moving image to the thermal stop of the digital camera 100 when the shooting of the moving image is continued. The thermal stop refers to an operation of the digital camera 100 that restricts the execution of a predetermined function such as shooting a moving image among functions that are originally executable in order to suppress an increase in temperature. Details of step S13 will be described below. When the shooting is interrupted in the middle due to the thermal stop, the user cannot shoot the scheduled moving image.

The controller 135 determines whether the recordable time tr calculated in step S12 is equal to or longer than the available shooting time determined in step S13 (S14).

If the recordable time tr is shorter than the available shooting time (No in S14), the controller 135 causes the display 130 to display warning display data (S15). The warning display data is, for example, data including display data indicating that the recordable time tr is shorter than the available shooting time, display data prompting the user to replace or add the recording medium, and the like. The display data includes, for example, image data such as icon image data, text data, and the like, and is displayed on the display 130.

In addition, the controller 135 may cause the display 130 to display the warning display data also when the available shooting time of the moving image calculated according to the remaining amount of the battery is shorter than the available shooting time determined in step S13. The warning display data in this case is data including display data or the like that prompts the user to replace or add a battery. The battery includes an internal battery, an external battery, and a combination of these, of the digital camera 100.

Figure 5:
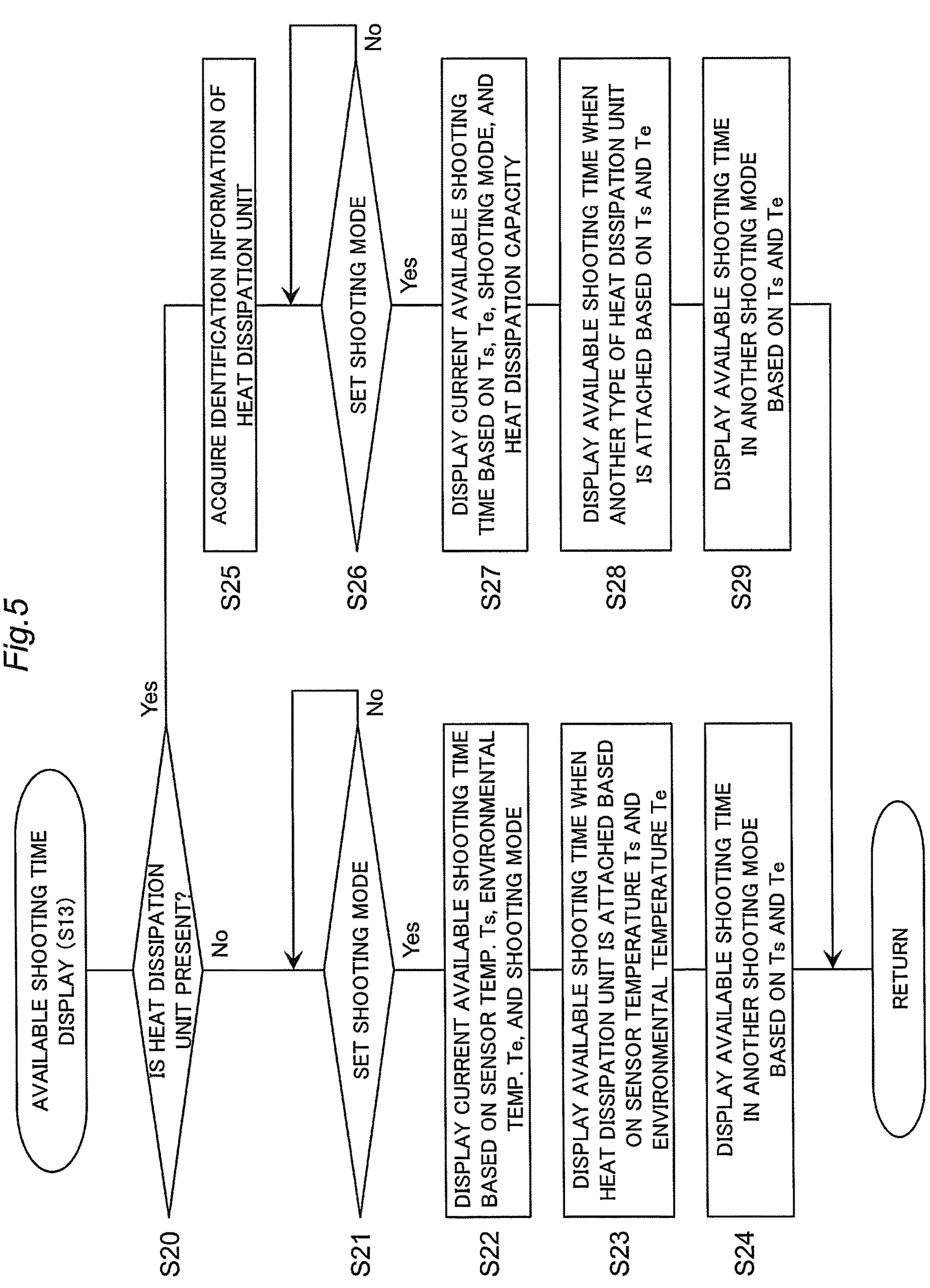
FIG. 5 is a flowchart illustrating the available shooting time display processing shown in FIG. 4.

FIG. 5 is a flowchart illustrating the available shooting time display processing S13 shown in FIG. 4. In the processing in FIG. 5, the controller 135 determines whether the heat dissipation unit 180 is attached to the heat dissipation unit I/F 170 (S20). For example, the heat-dissipation-unit detector 175 detects whether the heat dissipation unit 180 is connected to the heat dissipation unit I/F 170, and transmits a detection result to the controller 135. Accordingly, the controller 135 can determine whether the heat dissipation unit 180 is attached to the heat dissipation unit I/F 170.

If the heat dissipation unit 180 is not attached to the heat dissipation unit I/F 170 (No in S20), if receiving the instruction to set the shooting mode (Yes in S21), the controller 135 proceeds to step S22.

The instruction to set the shooting mode in step S21 is input by the user through, for example, the operation member 150. In the instruction to set the shooting mode, the user can select, for example, a combination of the resolution (for example, 4K, 6K, 8K, and the like) of the moving image to be shot and the frame rate (for example, 30 P (or fps or Hz), 60 P, 120 P, or the like).

In step S22, based on the sensor temperature Ts, the environmental temperature Te, and the shooting mode, the controller 135 displays the current available shooting time, that is, when the heat dissipation unit 180 is not attached and the operation is performed in the shooting mode set in step S21.

Specifically, for example, by referring to the available shooting-time table stored in the flash memory 145, the controller 135 determines the available shooting time corresponding to the current state and generates display data including information related to the determined available shooting time. Thereafter, the controller 135 causes the display 130 to display the generated display data.

FIG. 6 is a table showing an example of the available shooting-time table 146. In the available shooting-time table 146 in FIG. 6, the available shooting time corresponding to: the shooting mode, the sensor temperature Ts and the environmental temperature Te respectively obtained in steps S10 and S11, and the presence or absence of attachment of the heat dissipation unit 180 and the heat dissipation capacity thereof is defined.

In the available shooting-time table 146 in FIG. 6, as an example, the available shooting times corresponding to the respective heat dissipation capacities of "low", "medium", and "high" are shown. The heat dissipation capacity of the first type (type A) heat dissipation unit 180 is determined by, for example, volume, surface area, material, and the like. The heat dissipation capacity of the second-type heat dissipation unit 180 can be changed by the controller 135 as described above. The definition stage of the heat dissipation capacity is not limited to three stages of "low", "medium", and "high", and may be set to two or four or more stages.

In step S22 in FIG. 5, the controller 135 refers to the available shooting-time table 146 to determine the available shooting time when the heat dissipation unit 180 is not attached and the operation is performed in the shooting mode set in step S21. For example, when the environmental temperature Te and the sensor temperature Ts are respectively 25° C. and 40° C., and the shooting mode set in step S21 is 4K60 P, the controller 135 refers to the available shooting-time table 146 and determines the available shooting time to be 20 minutes. Thereafter, the controller 135 prepares display data to be displayed on the display 130.

Next, the controller 135 displays the available shooting time when the heat dissipation unit 180 is attached based on the sensor temperature Ts and the environmental temperature Te (S23). Specifically, for example, the controller 135 refers to the available shooting-time table 146 to determine the available shooting time corresponding to the state in which the heat dissipation unit 180 is attached, and generates display data including information related to the determined available shooting time. Thereafter, the controller 135 causes the display 130 to display the generated display data.

Next, based on the sensor temperature Ts and the environmental temperature Te, the controller 135 displays the available shooting time when another shooting mode is set (S24).

Figure 7A:
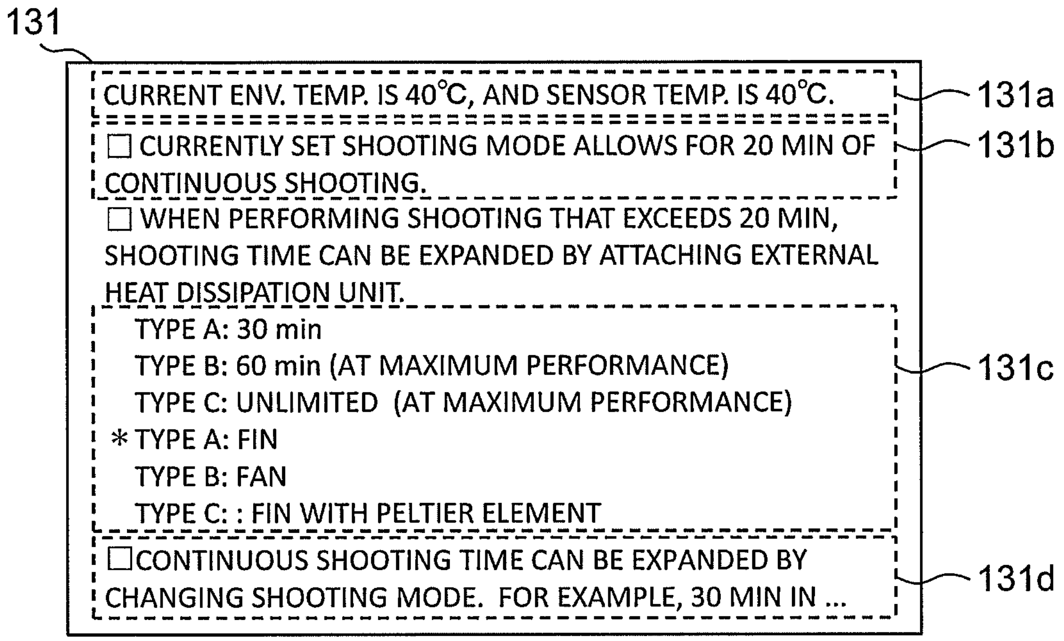
FIG. 7A is a view showing an example of a display screen displayed on the display of the digital camera.

FIG. 7A is a view showing an example of the display screen 131 displayed on the display 130 by going through steps S22 to S24 in FIG. 5. The environmental temperature Te and the sensor temperature Ts are displayed in the region 131*a* of the display screen 131. In the region 131*b*, the current available shooting time determined in step S22 is displayed.

In the region 131*c* of the display screen 131, the available shooting time when the heat dissipation unit 180 is attached, which is determined in step S23, is displayed.

In the region 131*d* of the display screen 131, the available shooting time when another shooting mode is set, which is determined in step S24, is displayed. The controller 135 may display, in the region 131*d*, only a shooting mode whose available shooting time is longer than the current available shooting time among the other shooting modes.

As described above, the digital camera 100 according to the present embodiment displays the current available shooting time in the region 131*b* of the display screen 131. Accordingly, the user can learn whether it is possible to shoot a moving image for a desired time using the digital camera 100.

In addition, the digital camera 100 displays the available shooting time when the heat dissipation unit 180 is attached in the region 131*c*, and displays the available shooting time when another shooting mode is set in the region 131*d*. Accordingly, the user has an opportunity to select the heat dissipation unit 180 and the shooting mode suitable for shooting a moving image for a desired time. As described above, the digital camera 100 can improve the convenience of the user at the time of shooting the moving image by displaying the information indicating the advice for extending the available shooting time.

Figure 7B:
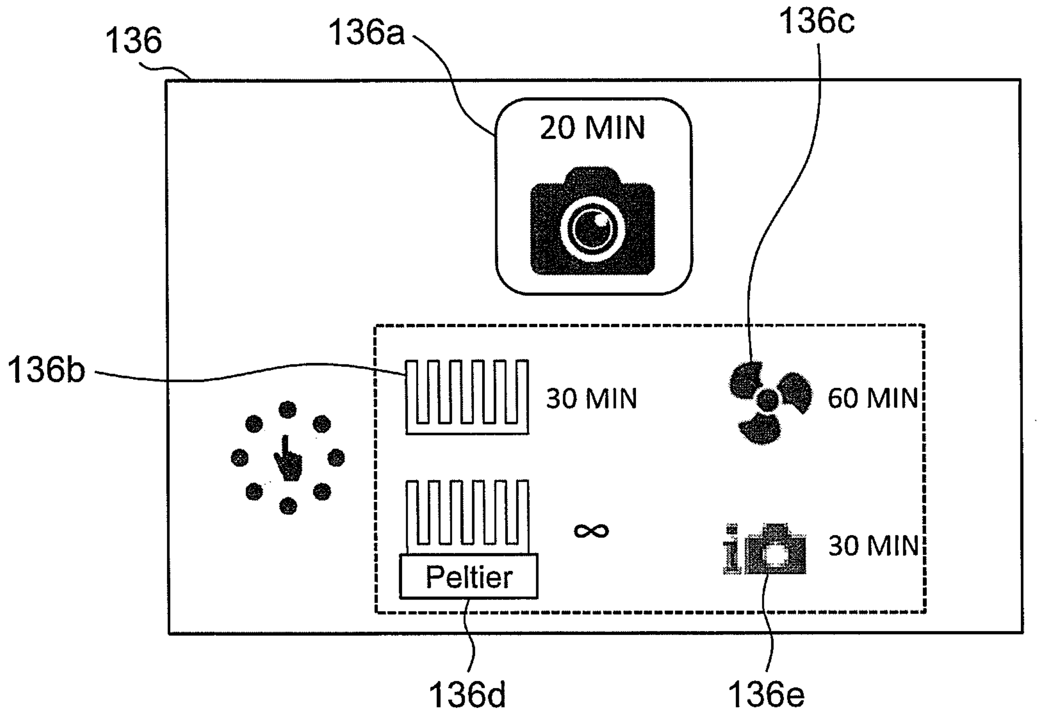
FIG. 7B is a view showing an example of a display screen.

The information as shown in FIG. 7A may be displayed as icons as shown in the display screen 136 illustrated in FIG. 7B. The icon 136*a* in FIG. 7B represents the current available shooting time (20 minutes) determined in step S22 in FIG. 5. The icon 136*b* indicates the shape of the heat dissipation member 180*a* such as a fin, and represents the available shooting time (30 minutes) when the heat dissipation member 180*a* is attached, which is determined in step S23. The icon 136*c* indicates the shape of the fan 180*b*, and represents the available shooting time (60 minutes) when the fan 180*b* is attached, which is determined in step S23. The icon 136*d* indicates the shape of the heat dissipation member 180*c* with a Peltier element, and represents the available shooting time when the heat dissipation member 180*c* is attached, which is determined in step S23.

The icon 136*e* in FIG. 7B represents the available shooting time when another shooting mode is set, which is determined in step S24. When the user selects the icon 136*e* by performing an operation such as a touch operation, the digital camera 100 may switch the operation mode to the shooting mode indicated by the icon 136*e*.

Returning to step S20 in FIG. 5, if the heat dissipation unit 180 is attached to the heat dissipation unit I/F 170 (Yes in S20), the controller 135 acquires identification information of the attached heat dissipation unit 180 (S25). In the above example, the heat-dissipation-unit detector 175 detects which of the heat dissipation member 180*a*, the fan 180*b*, and the fan 180*c* is connected to the heat dissipation unit I/F 170, further detects the heat dissipation capacity, and transmits a detection result to the controller 135. As a result, the controller 135 can acquire information indicating the type of the attached heat dissipation unit 180.

Next, if receiving the instruction to set the shooting mode (Yes in S26), the controller 135 displays the current available shooting time based on the sensor temperature Ts, the environmental temperature Te, the shooting mode, and the heat dissipation capacity (S27). Accordingly, the user can learn whether it is possible to shoot a moving image for a desired time using the digital camera 100.

Next, based on the sensor temperature Ts and the environmental temperature Te, the controller 135 displays an available shooting time when a heat dissipation unit of a type different from the heat dissipation unit 180 corresponding to the identification information acquired in step S25 is attached (S28).

Next, based on the sensor temperature Ts and the environmental temperature Te, the controller 135 displays the available shooting time when another shooting mode is set (S29).

Figure 8A:
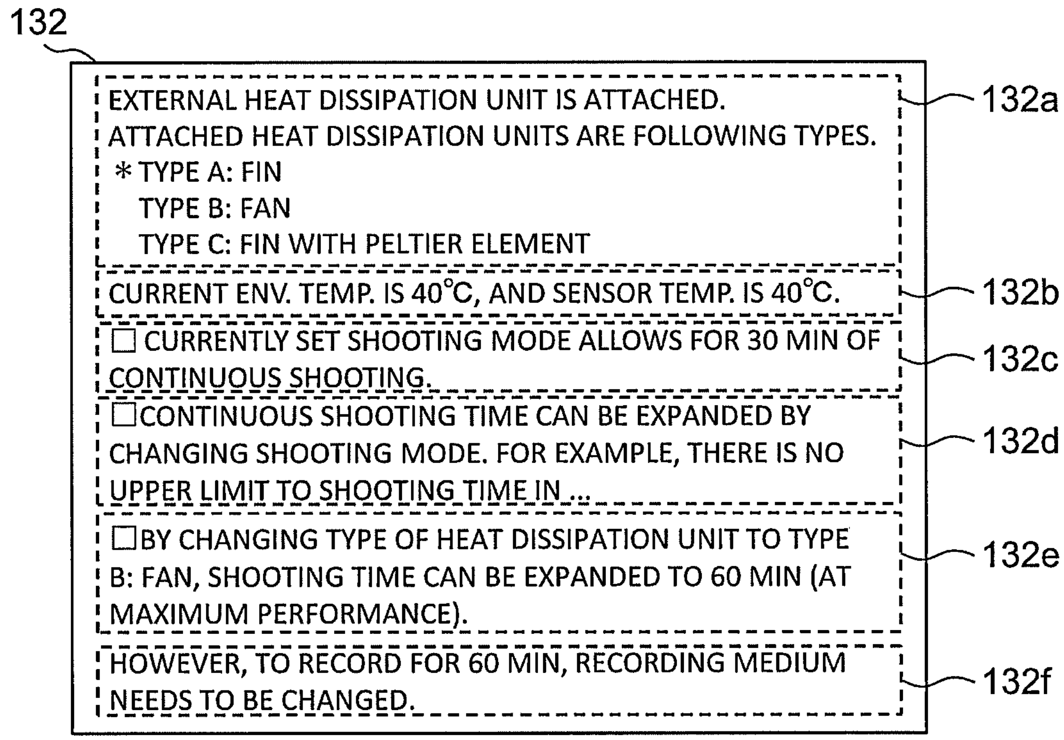
FIG. 8A is a view showing an example of a display screen.

FIG. 8A is a view showing an example of the display screen 132 displayed on the display 130 by going through steps S27 to S29 in FIG. 5. In the region 132*a* of the display screen 132, information indicating that the heat dissipation unit 180 is attached to the heat dissipation unit I/F 170 (see S20 in FIG. 5) and information indicating the type of the attached heat dissipation unit 180, which is acquired in step S25, are displayed. FIG. 8A shows an example in which the heat dissipation unit attached to the heat dissipation unit I/F 170 is a fin.

The environmental temperature Te and the sensor temperature Ts are displayed in the region 132*b* of the display screen 132. In the region 132*c*, the current available shooting time determined in step S27 is displayed.

In the region 132*d* of the display screen 132, the available shooting time when another shooting mode is set, which is determined in step S29, is displayed. The controller 135 may display, in the region 132*d*, only a shooting mode whose available shooting time is longer than the current available shooting time among the other shooting modes.

In the region 132*e* of the display screen 132, the available shooting time when another type of heat dissipation unit is attached, which is determined in step S28, is displayed. In the example shown, the other type of heat dissipation unit is a fan 180*b*.

In the region 132*f* of the display screen 132, an example of the warning display data determined in step S15 in FIG. 4 is displayed.

Figure 8B:
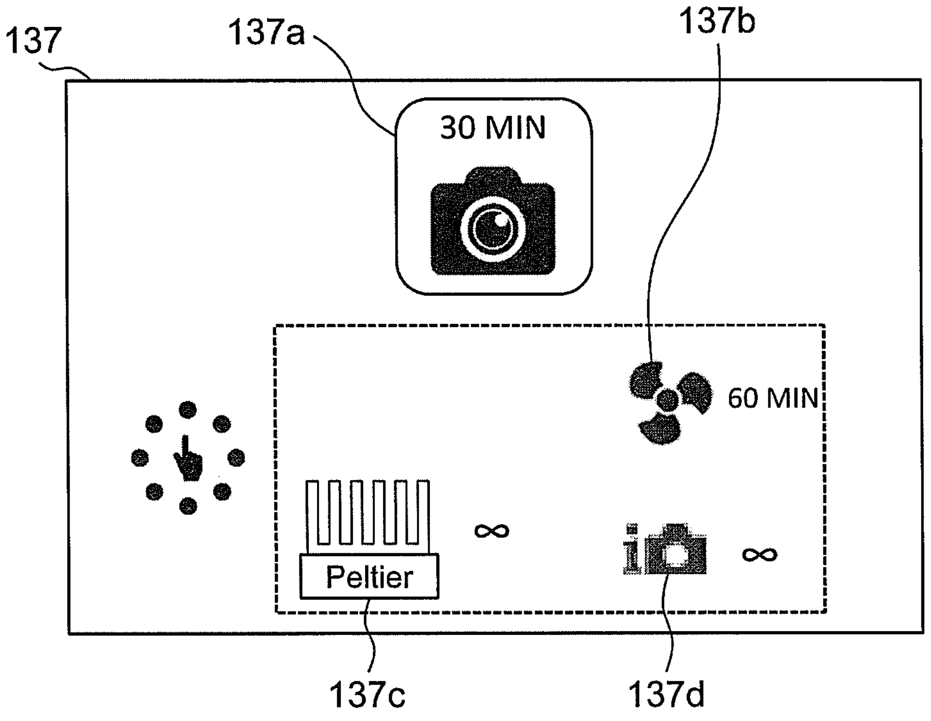
FIG. 8B is a view showing an example of a display screen.

The information as shown in FIG. 8A may be displayed as icons 137*a*, 137*b*, 137*c*, 137*d*, and the like as shown in the display screen 137 illustrated in FIG. 8B. The information indicated by each icon illustrated in FIG. 8B is similar to the information described for each icon in FIG. 7B described above.

As described above, according to the digital camera 100 according to the present embodiment, the user has an opportunity to select the heat dissipation unit 180 and the shooting mode suitable for shooting a moving image for a desired time. The digital camera 100 can improve the convenience of the user at the time of shooting the moving image by displaying the information indicating the advice for extending the available shooting time.

1-2-3. Shooting Processing

Figure 9:
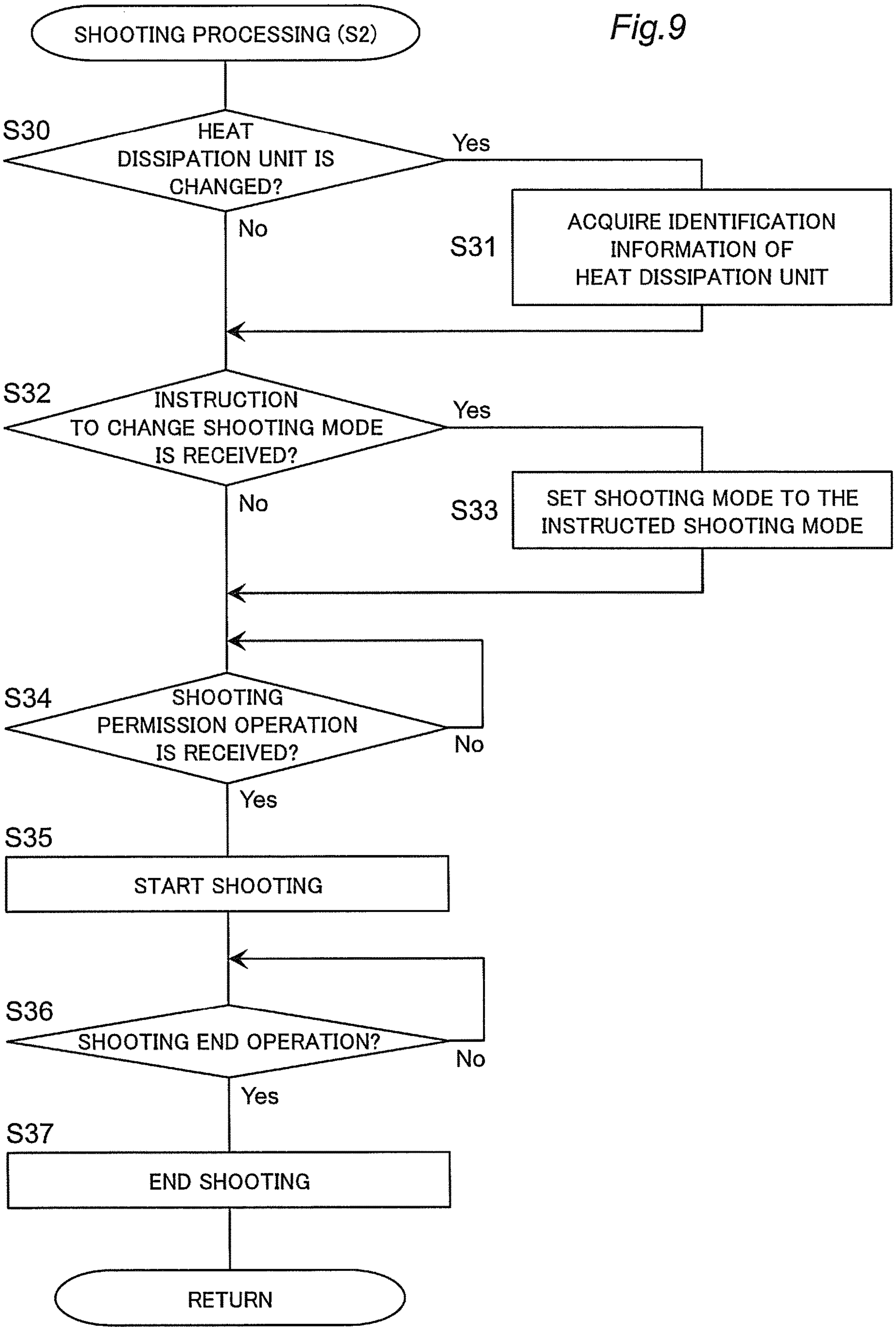
FIG. 9 is a flowchart illustrating shooting processing shown in FIG. 3.

FIG. 9 is a flowchart illustrating the shooting processing S2 shown in FIG. 3.

In the shooting processing S2 in FIG. 9, the controller 135 determines whether the heat dissipation unit 180 has been changed (S30). It is expected that such a change in the heat dissipation unit 180 is performed, by the user, using the operation member 150 based on, for example, information displayed on the display screen 131 or 132.

In the determination in step S30, for example, when the type or model of the heat dissipation unit 180 attached to the heat dissipation unit I/F 170 is changed, the controller 135 determines that the heat dissipation unit 180 is changed. In addition, when the heat dissipation unit 180 has not been attached to the heat dissipation unit I/F 170, the controller 135 determines that the heat dissipation unit 180 is changed also when detecting that the heat dissipation unit 180 is attached to the heat dissipation unit I/F 170.

If the heat dissipation unit 180 is changed (Yes in S30), the controller 135 acquires the type of the changed heat dissipation unit 180 (S31). After step S31, the controller 135 may cause the display 130 to display the available shooting time in the current state, that is, in the state after the change of the heat dissipation unit 180, similarly to step S22 or S27.

If it is determined in step S30 that the heat dissipation unit 180 has not been changed (No in S30), and after step S31, the controller 135 determines whether an instruction to change the shooting mode has been received (S32). It is expected that such a change instruction of the shooting mode is performed, by the user, using the operation member 150 based on, for example, information displayed on the display screen 131 or 132.

If receiving the instruction to change the shooting mode (Yes in S32), the controller 135 sets the shooting mode to the instructed shooting mode (S33). After step S33, the controller 135 may cause the display 130 to display the available shooting time in the current state, that is, in the state after the change of the shooting mode, similarly to step S22 or S27.

If it is determined in step S32 that the instruction to change the shooting mode is not received (No in S32), and next to step S33, the controller 135 determines whether a shooting permission operation is received (S34).

The shooting permission operation is performed by the user through the operation member 150. For example, on the display screen displayed on the display 130, the user can perform the shooting permission operation by depressing a permission button that permits the current type of the heat dissipation unit 180 and the currently set shooting mode. The permission button is an example of the operation member 150, and may be a hardware button provided on the casing of the digital camera 100 or a software button displayed on the display 130.

If receiving the shooting permission operation (Yes in S34), the controller 135 starts shooting (S35). If the shooting permission operation is not received (No in S34), the controller waits for the shooting permission operation. However, when a predetermined time elapses without the shooting permission operation, the controller 135 may end the shooting processing S2 in FIG. 9.

If receiving the shooting end operation after the shooting is started (Yes in S36), the controller 135 ends the shooting (S37).

1-3. Effects and the Like

As described above, the digital camera 100, which is an example of the imaging apparatus according to the present embodiment, includes the image sensor 115, which is an example of the image sensor, the heat dissipation unit I/F 170, which is an example of the connector, the controller 135, which is an example of the controller, and the notification unit (the display 130). The image sensor 115 shoots a subject image through the optical system and generates image data. The heat dissipation unit I/F 170 detachably attaches the heat dissipation unit 180. The controller 135 detects whether the heat dissipation unit 180 is attached to the heat dissipation unit I/F 170. The notification unit can notify the user of information. The controller 135 causes the notification unit to notify the available shooting time of the moving image according to the presence or absence of the attachment of the heat dissipation unit 180 (S13).

According to this configuration, the user can learn the available shooting time of the moving image according to the presence or absence of attachment of the heat dissipation unit 180 by the notification from the notification unit. Therefore, the digital camera 100 can improve the convenience of the user at the time of shooting the moving image with respect to the available shooting time.

If detecting that the heat dissipation unit 180 is not attached to the heat dissipation unit I/F 170 (No in S20), the controller 135 may cause the notification unit to notify the time during which the digital camera 100 can shoot the moving image in the state where the heat dissipation unit 180 is attached to the heat dissipation unit I/F 170 as the available shooting time (S23). According to this configuration, before attaching the heat dissipation unit 180, the user can learn the available shooting time when the heat dissipation unit 180 is attached to the heat dissipation unit I/F 170. Therefore, for example, the user can have an opportunity to select the heat dissipation unit 180 suitable for shooting a moving image for a desired time.

If detecting that the heat dissipation unit 180 is not attached to the heat dissipation unit I/F 170 (No in S20), the controller 135 may cause the notification unit to notify the time during which the digital camera 100 can shoot the moving image in the state where the heat dissipation unit 180 is not attached to the heat dissipation unit I/F 170 as the available shooting time (S22). According to this configuration, the user can learn whether it is possible to shoot a moving image for a desired time using the digital camera 100, for example.

The heat dissipation unit I/F 170 may detachably attach one of a plurality of heat dissipation units 180, and the one heat dissipation unit 180 may be replaceable with another heat dissipation unit 180 of the plurality of heat dissipation units 180 by attachment and detachment. If detecting that one of the plurality of heat dissipation units 180 is attached to the heat dissipation unit I/F 170 (Yes in S20), the controller 135 may cause the notification unit to notify the time during which the digital camera 100 can shoot the moving image in the state where another heat dissipation unit 180 of the plurality of heat dissipation units 180 is attached to the heat dissipation unit I/F 170 as the available shooting time (S28). According to this configuration, the user can have an opportunity to select the heat dissipation unit 180 suitable for shooting a moving image for a desired time.

The digital camera 100 may further include a temperature sensor 165 which is an example of a first temperature sensor that measures the temperature of the image sensor 115. The controller 135 determines the available shooting time based on the temperature of the image sensor 115 measured by the temperature sensor 165. According to this configuration, the user can learn a more accurate available shooting time. Therefore, the digital camera 100 can improve the convenience of the user at the time of shooting the moving image with respect to the available shooting time.

In the above example including the temperature sensor 165, the digital camera 100 may further include an environmental temperature sensor 166 which is an example of a second temperature sensor that measures the environmental temperature of the surrounding environment of the digital camera 100. The controller 135 may determine the available shooting time further based on the environmental temperature measured by the environmental temperature sensor 166. According to this configuration, the user can learn a more accurate available shooting time.

The controller 135 is operable in one shooting mode selected from among a plurality of shooting modes, and further based on the selected shooting mode, may determine the available shooting time. According to this configuration, the user can learn a more accurate available shooting time.

The heat dissipation unit I/F 170 may detachably attach one heat dissipation unit of a plurality of heat dissipation units 180, and the one heat dissipation unit may be replaceable with another heat dissipation unit of the plurality of heat dissipation units 180 by attachment and detachment. In this case, the controller 135 may detect the heat dissipation capacity of the heat dissipation unit 180 attached to the heat dissipation unit I/F 170, and determine the available shooting time based on the detected heat dissipation capacity of the heat dissipation unit 180.

The heat dissipation unit 180 may have identification information indicating a heat dissipation method and heat dissipation capacity or may have a structure corresponding to the identification information. The heat dissipation method of the heat dissipation unit may include a first type in which heat dissipation capacity is fixed and a second type in which heat dissipation capacity is changeable. According to this configuration, the user can learn a more accurate available shooting time.

In the present embodiment, the display 130 has been described as an example of the notification unit, but the notification unit is not limited thereto, and may be a voice output apparatus such as a speaker capable of notifying the user of information by voice.

2. Second Embodiment

2-1. Available Shooting Time Display Processing

In the second embodiment, the digital camera 100 displays, on the display 130, a shooting mode and/or the heat dissipation unit 180 that satisfies a user's request for a shooting time of a moving image. Accordingly, the digital camera 100 can suggest an appropriate shooting mode and/or heat dissipation unit 180 to the user.

Figure 10:
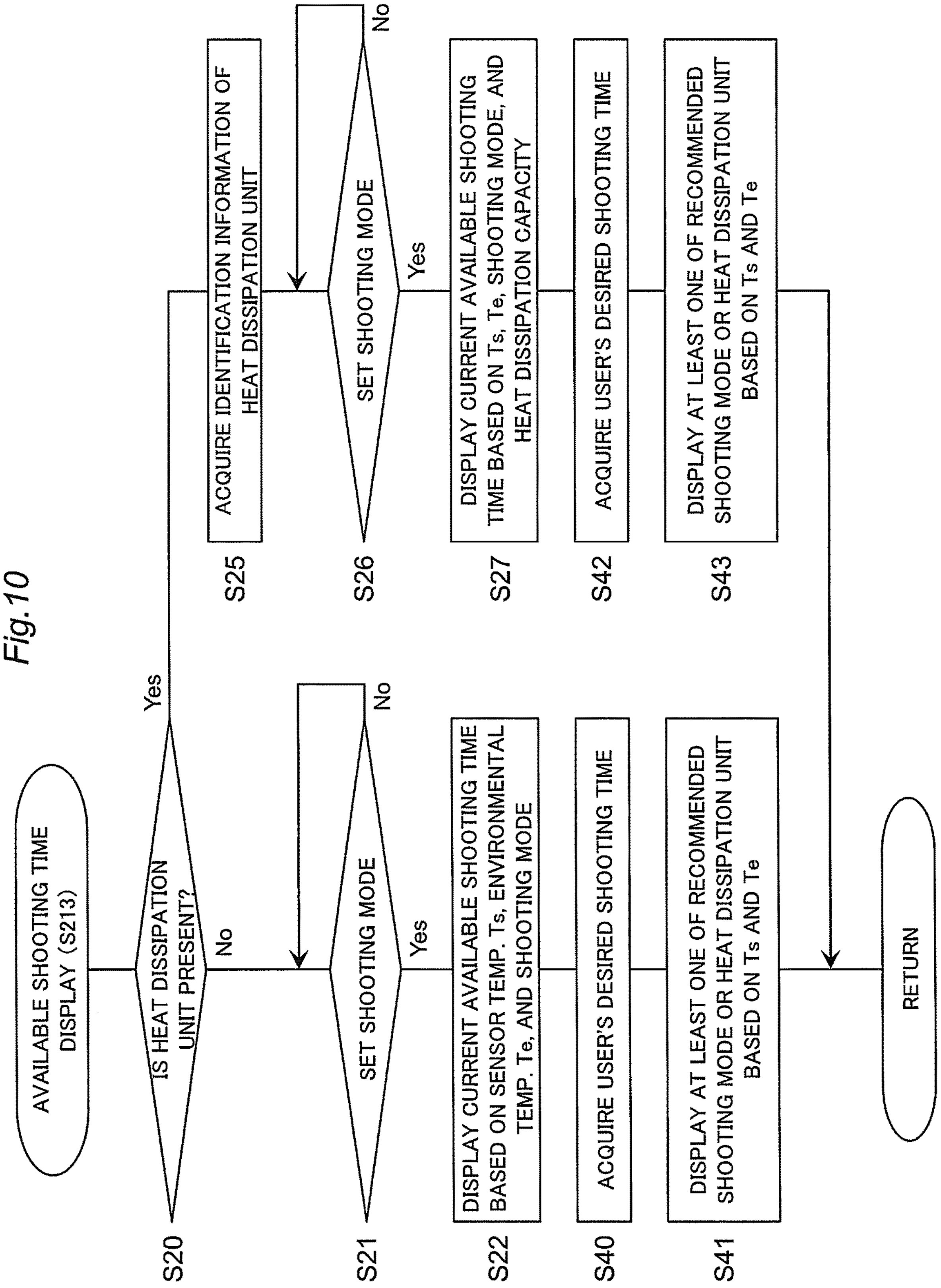
FIG. 10 is a flowchart illustrating available shooting time display processing according to a second embodiment.

FIG. 10 is a flowchart illustrating the available shooting time display processing S213 according to the present embodiment. As compared with the first embodiment, in the present embodiment, the controller 135 executes the available shooting time display processing S213 in FIG. 10 instead of the available shooting time display processing S13 in FIGS. 4 and 5.

Since steps S20 to S22 and S25 to S27 in FIG. 10 are similar to those in FIG. 5, the description thereof is omitted.

In step S40 executed if the heat dissipation unit 180 is not attached to the heat dissipation unit I/F 170 (No in S20), the controller 135 acquires information indicating a shooting time (desired shooting time) of the moving image desired by the user (S40). This information is input to the controller 135, for example, by the user performing a user operation to specify the desired shooting time using the operation member 150.

Next, the controller 135 causes the display 130 to display response information indicating at least one of the recommended shooting mode or heat dissipation unit 180 based on the sensor temperature Ts and the environmental temperature Te (S41). Here, the recommended shooting mode is a shooting mode that enables the shooting of a moving image over the desired shooting time of the user acquired in step S40. The recommended heat dissipation unit 180 is a heat dissipation unit 180 that enables the shooting of a moving image over a desired shooting time of the user. In step S41, the controller 135 may cause the display 130 to display a combination of a shooting mode and a heat dissipation unit 180 that enables the shooting of a moving image over the desired shooting time of the user.

Figure 11A:
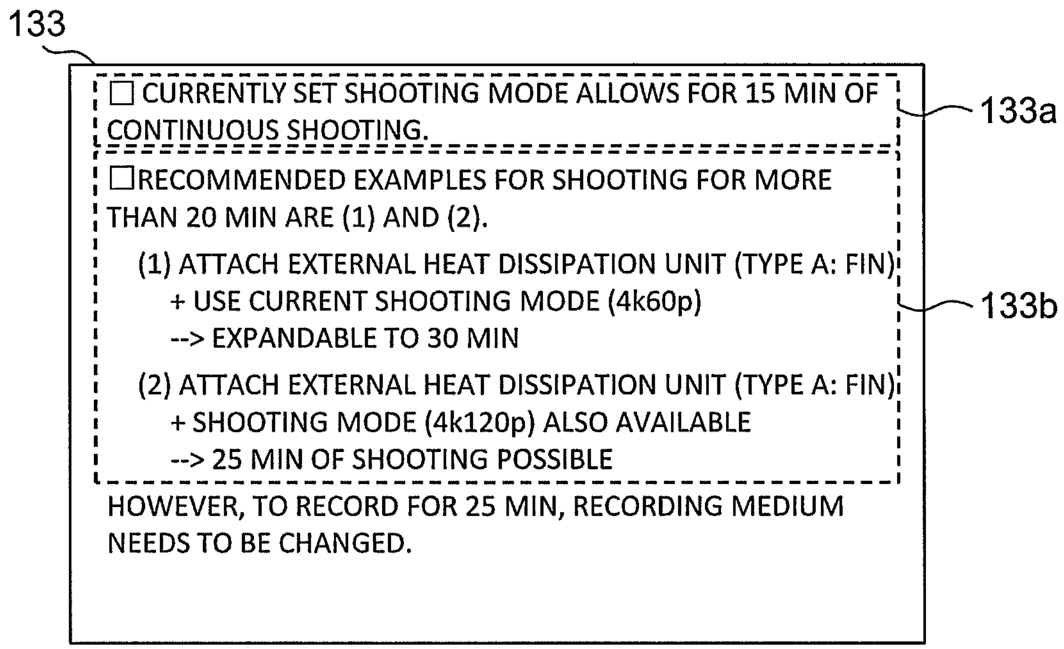
FIG. 11A is a view showing an example of a display screen in the second embodiment.

FIG. 11A is a view showing an example of the display screen 133 displayed on the display 130 by going through step S41 in FIG. 10. In the region 133*a* on the display screen 133, the current available shooting time determined in step S22 is displayed.

In the region 133*b* of the display screen 133, information indicating the recommended shooting mode and heat dissipation unit 180 determined in step S41 is displayed. The recommended shooting mode and heat dissipation unit 180, and the available shooting time after the change to the recommended shooting mode and heat dissipation unit 180 can be determined based on, for example, the available shooting-time table 146.

Figure 11B:
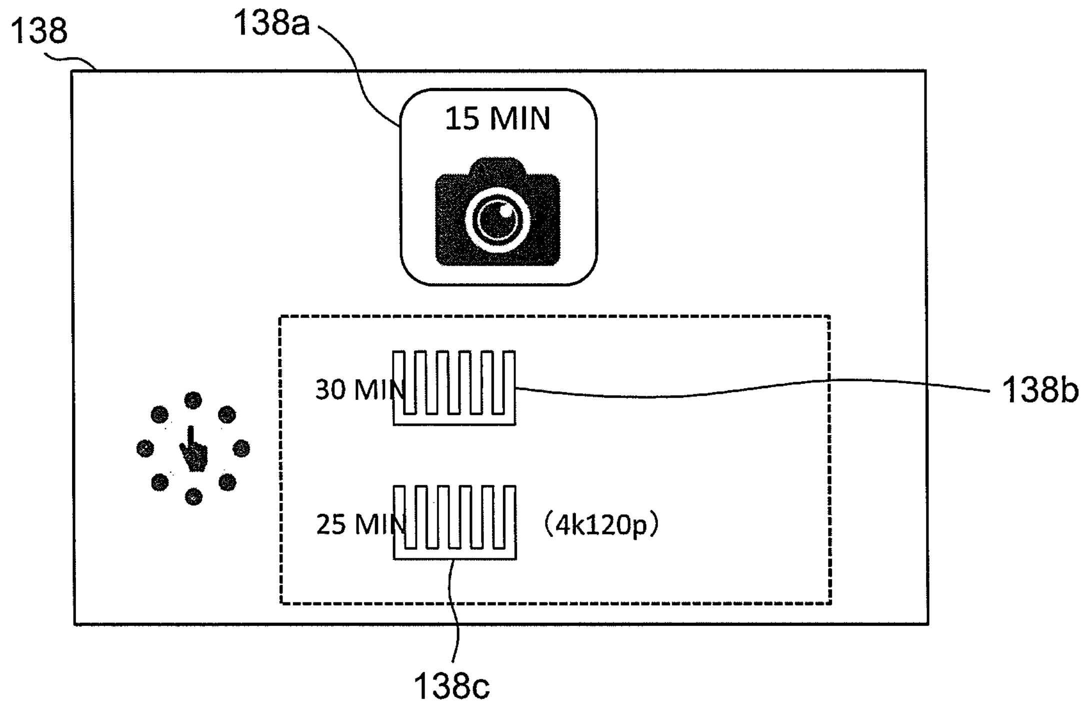
FIG. 11B is a view showing an example of a display screen in the second embodiment.

Specifically, for example, the controller 135 searches the available shooting-time table 146 for the available shooting time exceeding the desired shooting time by the user which is input in step S40. The controller 135 causes the display 130 to display the shooting mode and the heat dissipation unit 180 corresponding to the found available shooting time as a recommended shooting mode and heat dissipation unit 180. The information as shown in FIG. 11A may be displayed as icons 138*a*, 138*b*, 138*c*, and the like as shown in the display screen 138 illustrated in FIG. 11B.

Also in step S42 executed if the heat dissipation unit 180 is attached to the heat dissipation unit I/F 170 (Yes in S20), the controller 135 acquires information indicating the desired shooting time of the user (S42). Next, the controller 135 causes the display 130 to display at least one of the recommended shooting mode and heat dissipation unit 180 based on the sensor temperature Ts and the environmental temperature Te (S43). In step S43, the controller 135 may cause the display 130 to display a combination of a shooting mode and a heat dissipation unit 180 that enables the shooting of a moving image over the desired shooting time of the user.

FIG. 12A is a view showing an example of the display screen 134 displayed on the display 130 by going through step S43 in FIG. 10. In the region 134*a* of the display screen 134, information indicating that the heat dissipation unit 180 is attached to the heat dissipation unit I/F 170 (see S20 in FIG. 10) is displayed. In the region 134*b*, the current available shooting time determined in step S27 is displayed.

In the region 134*c* of the display screen 134, information indicating the recommended shooting mode and heat dissipation unit 180 determined in step S43 is displayed. The information as shown in FIG. 12A may be displayed as icons 139*a*, 139*b*, 139*c*, 139*d*, and the like as shown in the display screen 139 illustrated in FIG. 12B.

According to the digital camera 100 according to the present embodiment, the user can learn the combination of the shooting mode that enables the desired shooting time input by the user and the heat dissipation unit 180 by viewing the display 130. The user can perform moving image shooting for a desired time by switching the shooting mode according to the information displayed on the display 130 and attaching or changing the heat dissipation unit 180. As described above, the digital camera 100 can improve the convenience of the user at the time of shooting the moving image.

2-2. Shooting Processing

Figure 13:
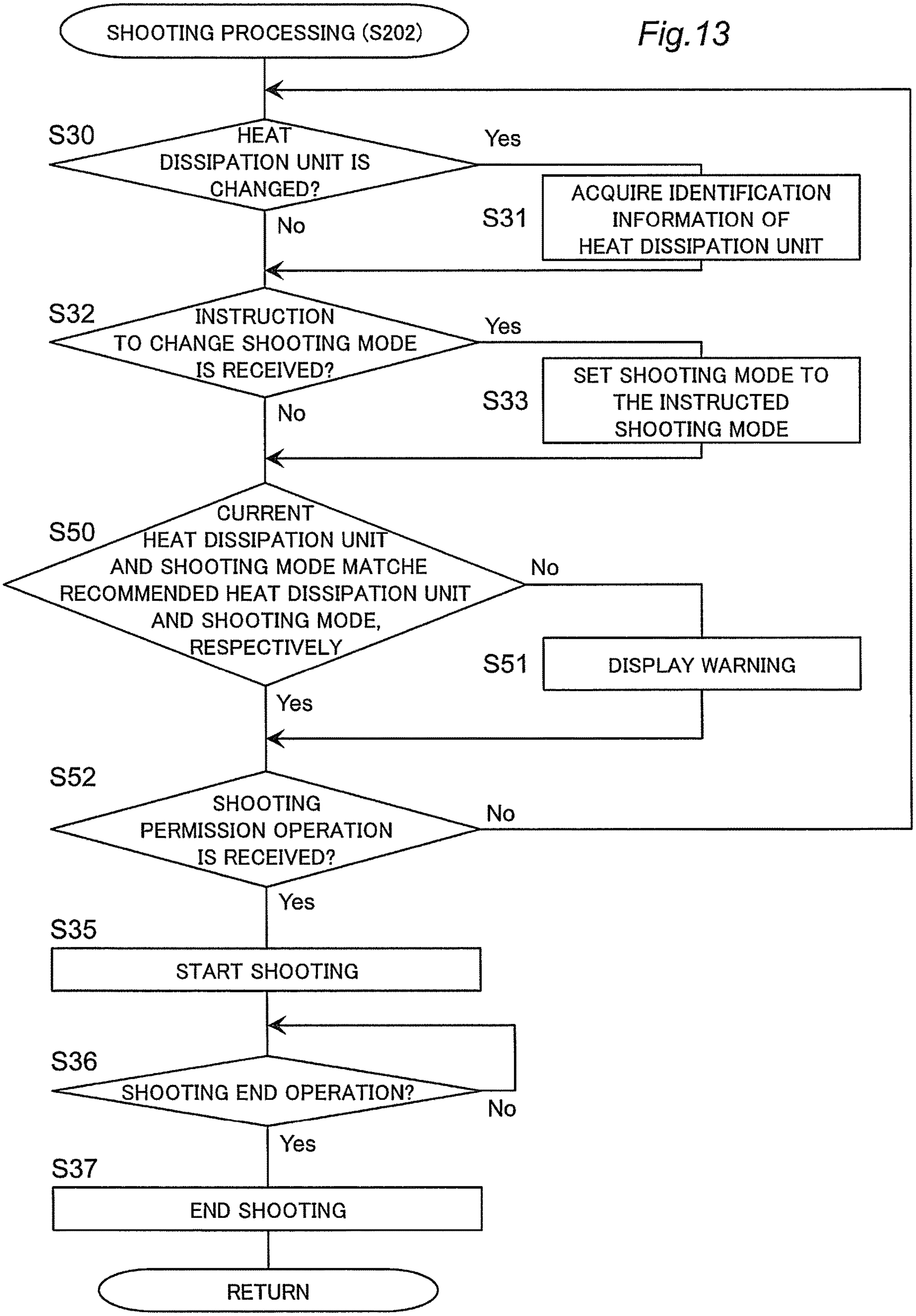
FIG. 13 is a flowchart illustrating shooting processing in the second embodiment.

FIG. 13 is a flowchart illustrating the shooting processing S202 according to the present embodiment. As compared with the first embodiment, in the present embodiment, the controller 135 executes the shooting processing S202 instead of the shooting processing S2 in FIG. 3.

As compared with the shooting processing S2 of the first embodiment shown in FIG. 9, the shooting processing S202 of the present embodiment shown in FIG. 13 further includes steps S50 to S52 instead of step S34 in FIG. 9. Since steps S30 to S33 and S35 to S37 in FIG. 13 are similar to those in FIG. 9, the description thereof is omitted.

In step S50, the controller 135 determines whether the heat dissipation unit 180 is attached and, if attached, whether the type of the heat dissipation unit 180 matches at least one of the contents displayed as recommended in step S41 or S43 in FIG. 10. In addition, in step S50, the controller 135 determines whether the set shooting mode matches at least one of the content displayed in step S41 or S43 in FIG. 10. For example, if the heat dissipation unit 180 and the shooting mode respectively match the recommended heat dissipation unit 180 and the recommended shooting mode (Yes in S50), the process proceeds to step S52.

If the heat dissipation unit 180 does not match the recommended heat dissipation unit 180, or if the set shooting mode does not match the recommended shooting mode (No in S50), the controller 135 causes the display 130 to display a warning display (S51).

The determination in step S50 is executed, for example, when a shooting start button, which is an example of the operation member 150, is pressed by the user. The shooting start button is different from the above-described shooting permission button.

The warning display displayed in step S51 is, for example, a display including text such as "the heat dissipation unit is different from the recommended one" or "the shooting mode is different from the recommended one". Alternatively, or in addition thereto, the warning display displayed in step S51 may be a display including text such as "continuous shooting cannot be performed for X minutes with the currently attached heat dissipation unit" or "continuous shooting cannot be performed for X minutes in the currently set shooting mode". Here, X is the desired shooting time of the user.

With such a warning display, the user can notice that the heat dissipation unit 180 is erroneously attached, or is forgotten to be attached, or that the shooting mode is erroneously set. Therefore, the user can attach the correct heat dissipation unit 180 or set the correct shooting mode without performing the shooting permission in step S52 subsequent to step S51. Accordingly, it is possible to prevent beforehand a situation in which the moving image over the desired shooting time of the user is not shot.

2-3. Effects and the Like

As described above, the digital camera 100 according to the present embodiment includes the image sensor 115, the heat dissipation unit I/F 170, the controller 135, the notification unit, and the operation member 150 which receives a user operation for specifying the shooting time of the moving image desired by the user. When the shooting time is specified through the operation member 150, the controller 135 causes the notification unit to notify information indicating at least one of the shooting mode or the heat dissipation unit 180 that enables shooting of the moving image over the specified shooting time (S41, S43).

When the shooting time is specified through the operation member 150, the controller 135 may cause the notification unit to notify a combination of the shooting mode and the heat dissipation unit 180 that enable shooting of the moving image over the shooting time.

According to the digital camera 100 according to the present embodiment, the user can learn at least one of the shooting mode or the heat dissipation unit 180 that enables shooting over the shooting time specified by the user. The user can perform moving image shooting for a desired time by switching the shooting mode or attaching or changing the heat dissipation unit 180 according to the obtained information. As described above, the digital camera 100 according to the present embodiment can improve the convenience of the user at the time of shooting the moving image.

When a shooting mode or a heat dissipation unit 180 different from at least one of the shooting mode or the heat dissipation unit 180 notified by the notification unit is specified through the operation member 150, the controller 135 may cause the notification unit to notify warning information (S51). With the warning information, the user can notice that the heat dissipation unit 180 is erroneously attached or is forgotten to be attached, and/or that the shooting mode is erroneously set. Accordingly, the digital camera 100 can prevent beforehand a situation in which the moving image over the desired shooting time of the user is not shot.

3. Third Embodiment

In the first embodiment, an example in which the available shooting time is determined only before the shooting start (S35 in FIG. 9) has been described (see FIG. 3). However, the controller 135 may obtain the available shooting time again after the start of shooting, and may cause the display 130 to display a warning display or an available shooting time that has reduced when the available shooting time is reduced by a predetermined time or more from the expectation before the start of shooting. For example, when a rapid rise in environmental temperature occurs after the start of shooting, a situation in which the available shooting time is reduced from the expectation before the start of shooting occurs.

Figure 14:
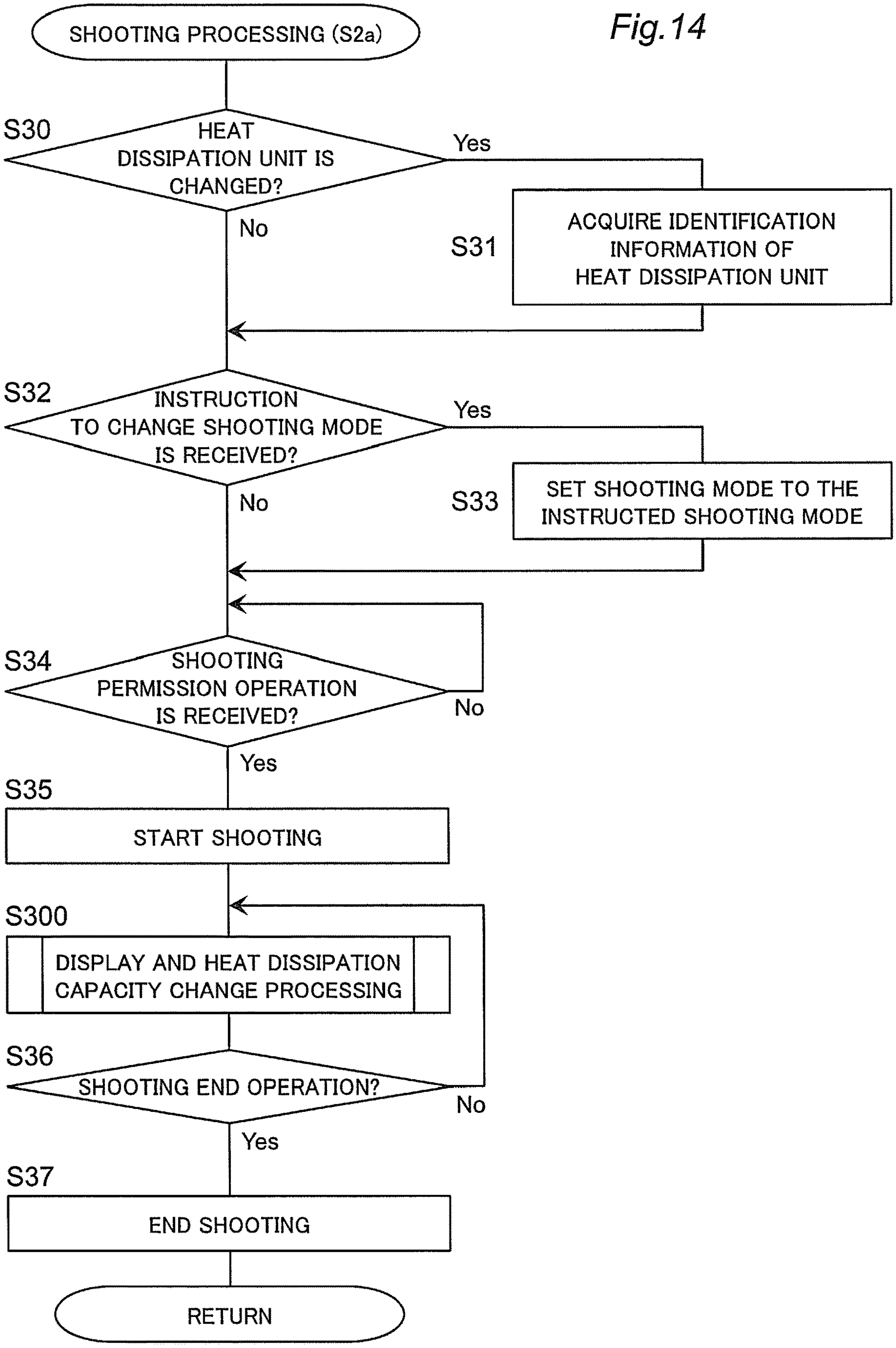
FIG. 14 is a flowchart illustrating shooting processing in a third embodiment.

FIG. 14 is a flowchart illustrating the shooting processing S2*a* according to such a third embodiment. The shooting processing S2*a* in FIG. 14 is executed instead of the shooting processing S2 in FIG. 3. As compared with the shooting processing S2 shown in FIG. 9, the shooting processing S2*a* includes display and heat dissipation capacity change processing S300. As described below, the display and heat dissipation capacity change processing S300 includes display processing and heat dissipation capacity change processing. The display and heat dissipation capacity change processing S300 is executed during shooting (between steps S35 and S36).

Figure 15:
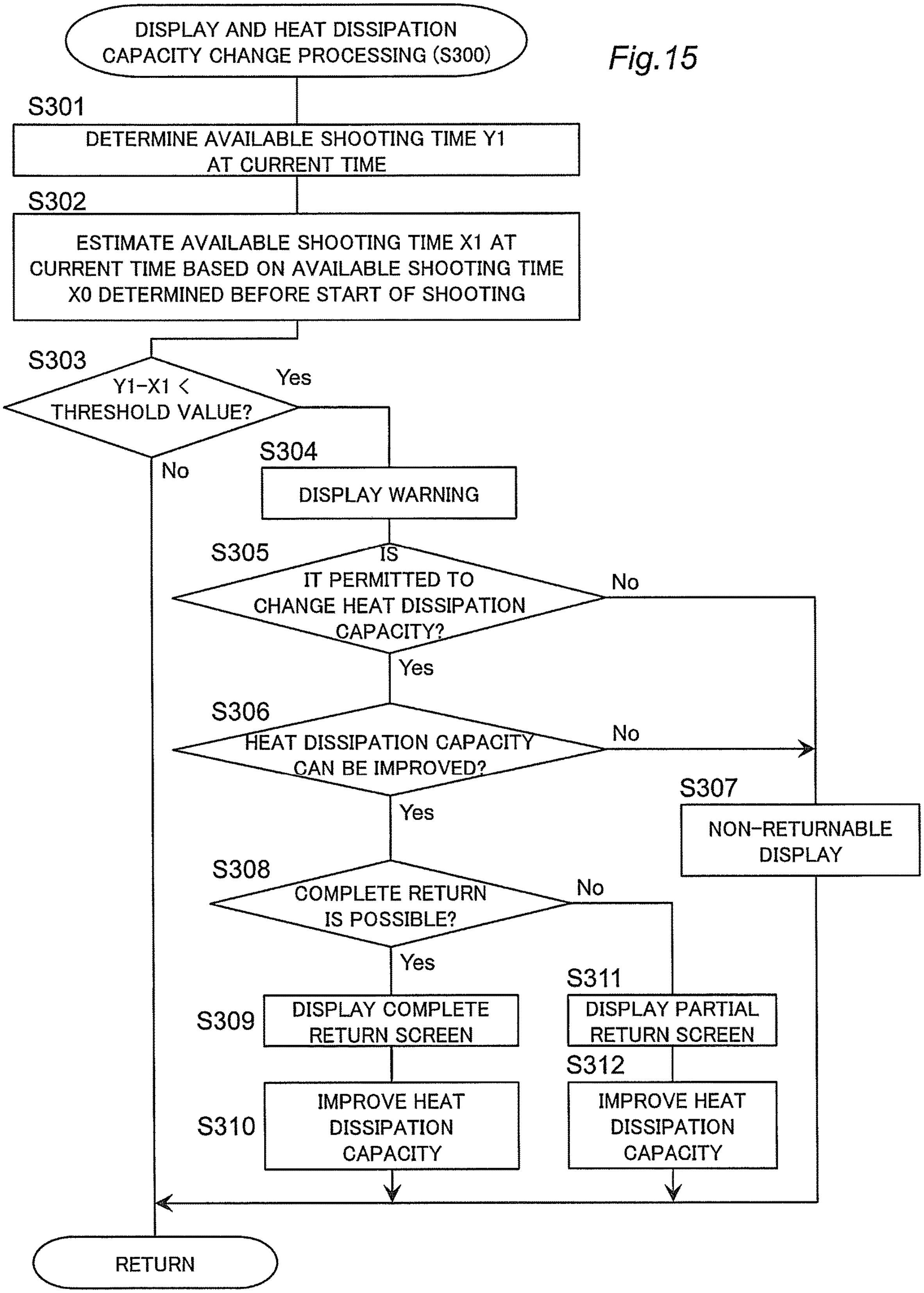
FIG. 15 is a flowchart illustrating the display and heat dissipation capacity change processing in FIG. 14.

FIG. 15 is a flowchart illustrating the display and heat dissipation capacity change processing S300 in FIG. 14.

In the display and heat dissipation capacity change processing S300, the controller 135 determines the available shooting time Y1 at the current time t during the shooting (S301). Step S301 is similar to step S22 in FIG. 5 when the heat dissipation unit 180 is not attached to the heat dissipation unit I/F 170, and is similar to step S27 in FIG. 5 when the heat dissipation unit 180 is attached.

Next, the controller 135 estimates the available shooting time X1 at the current time t based on the available shooting time X0 determined before the start of shooting (S302). For example, the controller 135 estimates the available shooting time X1 at the time t by subtracting the shooting time performed by the time t from X0.

When the heat dissipation unit 180 is not attached, the available shooting time X0 determined before the start of shooting is the available shooting time corresponding to the shooting mode at the present time among the available shooting times obtained in steps S22, S23, or S24 in FIG. 5. On the other hand, when the heat dissipation unit 180 is attached, the available shooting time X0 is an available shooting time corresponding to the shooting mode and the heat dissipation unit 180 at the present time among the available shooting times obtained in step S27, S28, or S29.

Next, the controller 135 determines whether Y1−X1 is less than a predetermined threshold value (S303). For example, the controller 135 determines whether Y1−X1 is less than 0. Determining whether Y1−X1 is less than 0 is an example of "predicting that the actual shooting time of the moving image will be shorter than the available shooting time". The actual shooting time is, for example, the sum of the shooting time performed by the time t and the available shooting time Y1 at the current time t during shooting.

If Y1−X1 is less than the predetermined threshold value (Yes in S303), the controller 135 causes the display 130 to display a warning display screen as information indicating that the actual shooting time is shorter than the available shooting time (S304).

Figure 16:
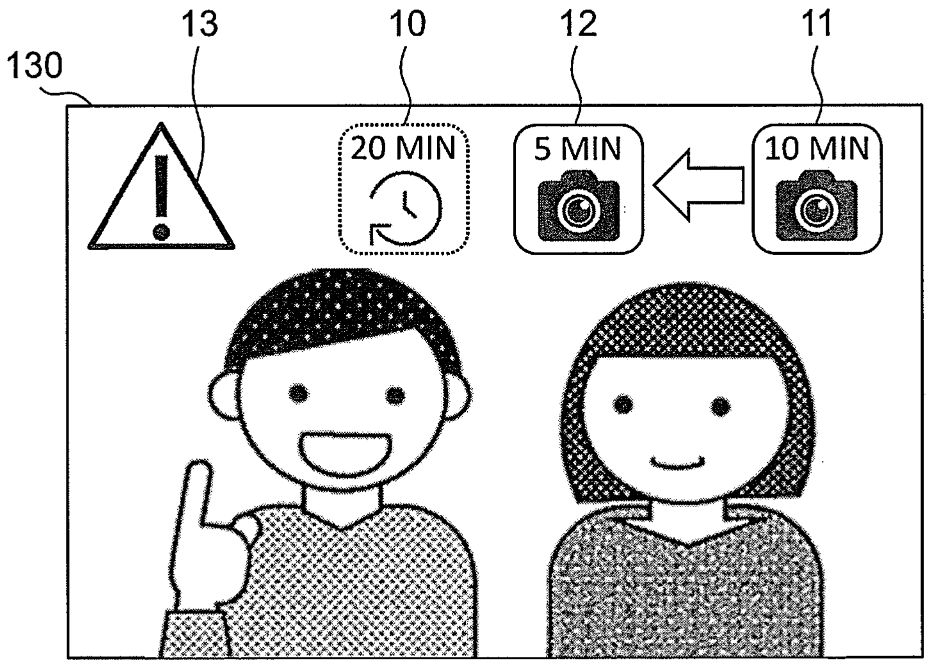
FIG. 16 is a view showing an example of a warning display screen in the third embodiment.

FIG. 16 is a view showing an example of the warning display screen displayed in step S304. On the warning display screen illustrated in FIG. 16, icons 10 to 13 are displayed in addition to the live view image. The icon 10 represents an elapsed time (shooting time) from the shooting start time to the current time t.

The icon 11 represents the available shooting time X1 at the current time t estimated in step S302. The estimated available shooting time X1 at the current time t can be obtained by subtracting the shooting time (20 minutes in this example) indicated by the icon 10 from the available shooting time X0 (30 minutes in this example) determined before the start of shooting. The icon 12 represents the available shooting time Y1 (5 minutes) at the current time t during the shooting, which is determined in step S301. The warning display icon 13 represents that the actual shooting time is shorter than the available shooting time.

On the display screen displayed in step S304, for example, text such as "Available shooting time has changed. Available shooting time is 5 minutes starting from the present." may be displayed.

The warning display allows the user to take action to enable shooting of the moving image over a desired shooting time, such as by changing at least one of the shooting mode or the heat dissipation unit 180.

Returning to FIG. 15, the controller 135 determines whether it is permitted to change the heat dissipation capacity of the heat dissipation unit 180 (S305). For example, the user can perform settings in advance of permitting changing the heat dissipation capacity of the heat dissipation unit 180 using the operation member 150.

Figure 17:
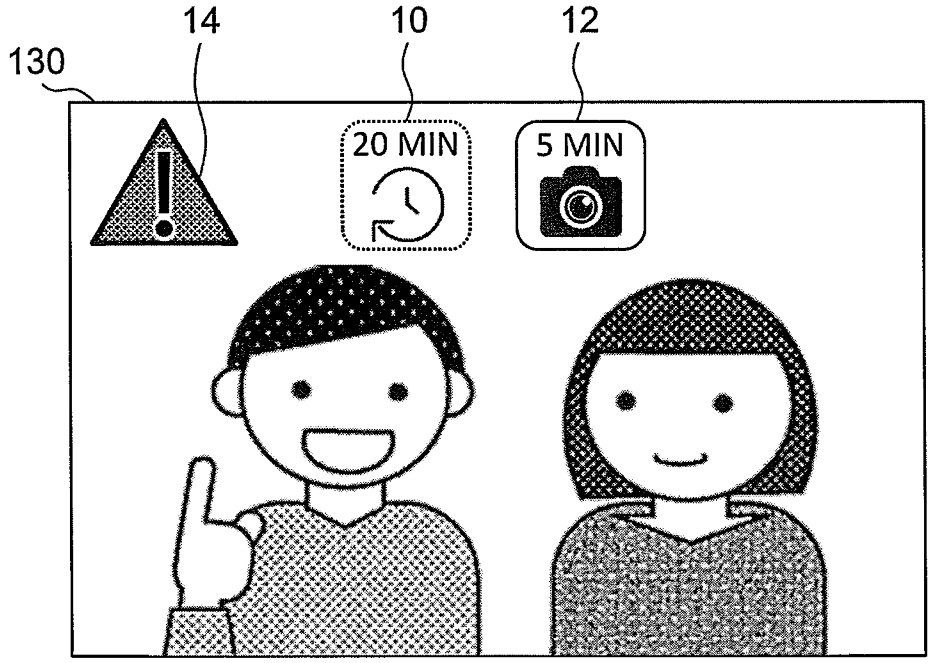
FIG. 17 is a view showing an example of a non-returnable display screen in the third embodiment.

If it is not permitted to change the heat dissipation capacity of the heat dissipation unit 180 (No in S305), the controller 135 performs non-returnable display processing (S307). In the present embodiment, the return refers to the processing of making the actual shooting time expected to be shorter than the available shooting time X0 determined before the start of shooting equal to the available shooting time X0. The non-returnable display refers to a display including information indicating that the return cannot be performed. For example, in the non-returnable display processing S307, as shown in FIG. 17, the controller 135 causes the display 130 to display a non-returnable icon 14 as the non-returnable display. The non-returnable icon 14 has, for example, the same shape as the warning display icon 13 in FIG. 16, but has a different color. For example, the non-returnable icon 14 is displayed in red.

Returning to FIG. 15, if determining that it is permitted to change the heat dissipation capacity of the heat dissipation unit 180 (Yes in S305), the controller 135 determines whether the heat dissipation capacity of the heat dissipation unit 180 can be improved (S306). For example, when the heat dissipation capacity of the heat dissipation unit 180 is already set to the maximum value, when the heat dissipation unit 180 is not configured to be able to change the heat dissipation capacity, when power cannot be supplied to the heat dissipation unit 180, or the like, the heat dissipation capacity cannot be improved.

If the heat dissipation capacity of the heat dissipation unit 180 cannot be improved (No in S306), the non-returnable display processing S307 is executed.

If determining that the heat dissipation capacity can be improved (Yes in S306), the controller 135 determines whether complete return is possible (S308). The complete return means that the available shooting time Y1 at the current time t during shooting increases and the actual shooting time becomes equal to the available shooting time X0. For example, the controller 135 determines that the complete return is possible when the power sufficient to implement the complete return can be supplied to the heat dissipation unit 180.

If determining that the complete return is possible (Yes in S308), the controller 135 causes the display 130 to display a complete return screen indicating the complete return (S309).

Figure 18:
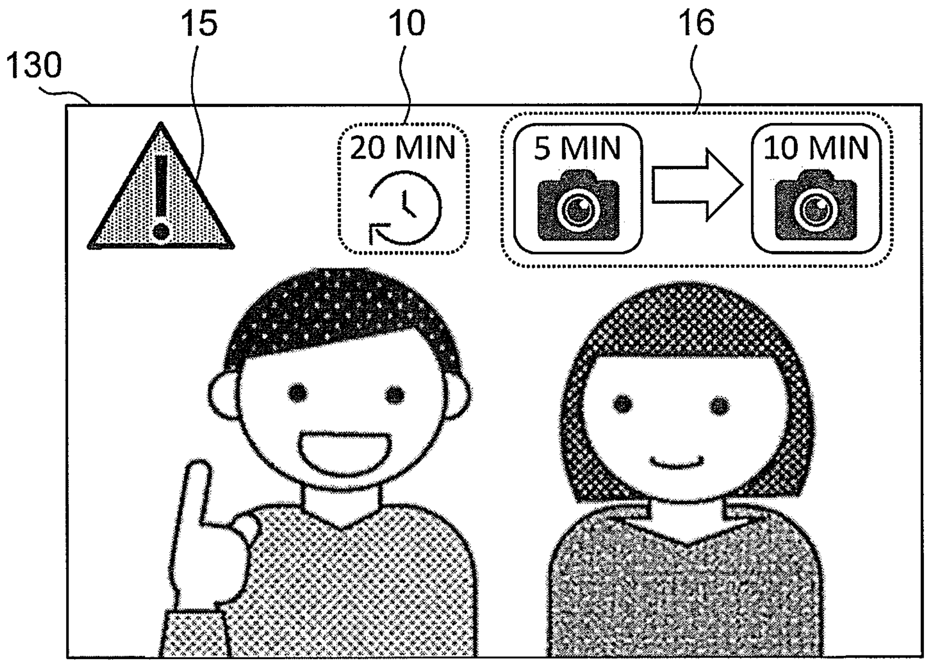
FIG. 18 is a view showing an example of a complete return screen in the third embodiment.

FIG. 18 is a view showing an example of a complete return screen. On the complete return screen, a complete return icon 15 indicating the complete return is displayed. The complete return icon 15 has the same shape as, for example, the warning display icon 13 in FIG. 16 and the non-returnable icon 14 in FIG. 17, but has a different color from both of them. For example, the complete return icon 15 is displayed in green. In addition, complete return information 16 indicating that the available shooting time Y1 at the current time t has increased due to the complete return may be displayed on the complete return screen. In the example in FIG. 18, it is shown that the available shooting time Y1 at the current time t can be increased from 5 minutes to 10 minutes by the complete return.

Returning to FIG. 15, after step S309, the controller 135 improves the heat dissipation capacity of the heat dissipation unit 180 at least until complete return is completed (S310).

Returning to step S308, if determining that the complete return is not possible (No in S308), the controller 135 causes the display 130 to display a partial return screen indicating the partial return (S311) and improves the heat dissipation capacity of the heat dissipation unit 180 (S312). When the partial return is performed, the available shooting time Y1 at the current time t during the shooting increases, but the actual shooting time is less than the available shooting time X0.

Figure 19:
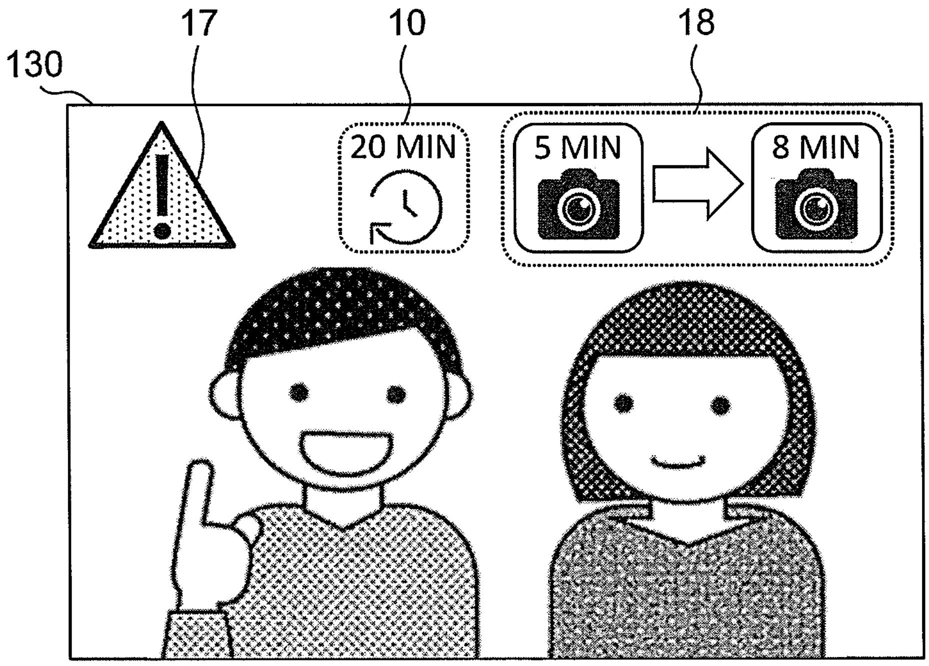
FIG. 19 is a view showing an example of a partial return screen in the third embodiment.

FIG. 19 is a view showing an example of a partial return screen. A partial return icon 17 indicating partial return is displayed on the partial return screen. The partial return icon 17 has the same shape as, for example, the warning display icon 13 in FIG. 16, the non-returnable icon 14 in FIG. 17, and the complete return icon 15 in FIG. 18, but has a different color from any of them. For example, the partial return icon 17 is displayed in yellow. In addition, partial return information 18 indicating that the available shooting time Y1 at the current time t has increased due to the partial return may be displayed on the partial return screen. In the example in FIG. 19, it is shown that the available shooting time Y1 at the current time t can be increased from 5 minutes to 8 minutes by the partial return.

As described above, in the digital camera 100 according to the present embodiment, if predicting that the actual shooting time of the moving image becomes shorter than the available shooting time X0 during shooting of the moving image (Yes in S303), the controller 135 causes the notification unit to notify information indicating that the actual shooting time becomes shorter than the available shooting time X0 (S304).

According to this configuration, the user can learn that the actual shooting time is shorter than the available shooting time X0. Therefore, the digital camera 100 can improve the convenience of the user at the time of shooting the moving image with respect to the available shooting time.

When predicting that the actual shooting time becomes shorter than the available shooting time X0 during shooting of the moving image, the controller 135 may bring the actual shooting time close to the available shooting time X0 (S312) or match the actual shooting time with the available shooting time X0 (S310) by increasing the heat dissipation capacity of the heat dissipation unit 180.

According to this configuration, regarding the available shooting time, the convenience of the user at the time of shooting a moving image can be improved.

When determining that the actual shooting time can be brought close to the available shooting time X0 by increasing the heat dissipation capacity of the heat dissipation unit 180, the controller 135 may cause the display 130 to display a partial return screen which is an example of a first display (S311). When determining that the actual shooting time can be matched with the available shooting time X0 by increasing the heat dissipation capacity of the heat dissipation unit 180, the controller 135 may cause the display 130 to display a complete return screen which is an example of a second display (S309).

When predicting that the actual shooting time becomes shorter than the available shooting time X0 during the shooting of the moving image and determining that it is impossible to make the actual shooting time close to or coincide with the available shooting time X0 by increasing the heat dissipation capacity of the heat dissipation unit 180, the controller 135 may cause the display 130 to display the non-returnable display which is an example of a third display.

4. Other Embodiments

As described above, the embodiments are described as the exemplification of the technique in the present disclosure. However, the technique in the present disclosure is not limited thereto, and can also be applied to embodiments in which changes, substitutions, additions, omissions, and the like are made as appropriate. In addition, it is also possible to combine each component described in the above preferred embodiments to form a new preferred embodiment. Therefore, modifications as other embodiments will be described below.

4-1. First Modification

In the first embodiment, an example has been described in which the heat-dissipation-unit detector 175 detects whether the heat dissipation unit 180 is attached, and the type (heat dissipation method) and heat dissipation capacity of the heat dissipation unit 180. However, the heat-dissipation-unit detector 175 is not indispensable for the digital camera 100 according to the present disclosure, and for example, the function of the heat-dissipation-unit detector 175 may be implemented by the controller 135.

4-2. Second Modification

In the first embodiment, an example has been described in which the controller 135 determines the available shooting time corresponding to the current state by referring to the available shooting-time table 146 stored in the flash memory 145, but the method of determining the available shooting time is not limited thereto.

For example, the flash memory 145 may store time-series temperature curve data or a graph according to the operation of the digital camera 100. Such temperature curve data or a graph is created based on, for example, the sensor temperature Ts or the environmental temperature Te actually measured during the operation of the digital camera 100. In this case, by comparing the temperature curve data or the graph, with the temperature data at the time of execution in the available shooting time display processing S13, the controller 135 can estimate the time from the time of execution until the estimation time at which the sensor temperature Ts reaches the temperature of the thermal stop.

Figure 20:
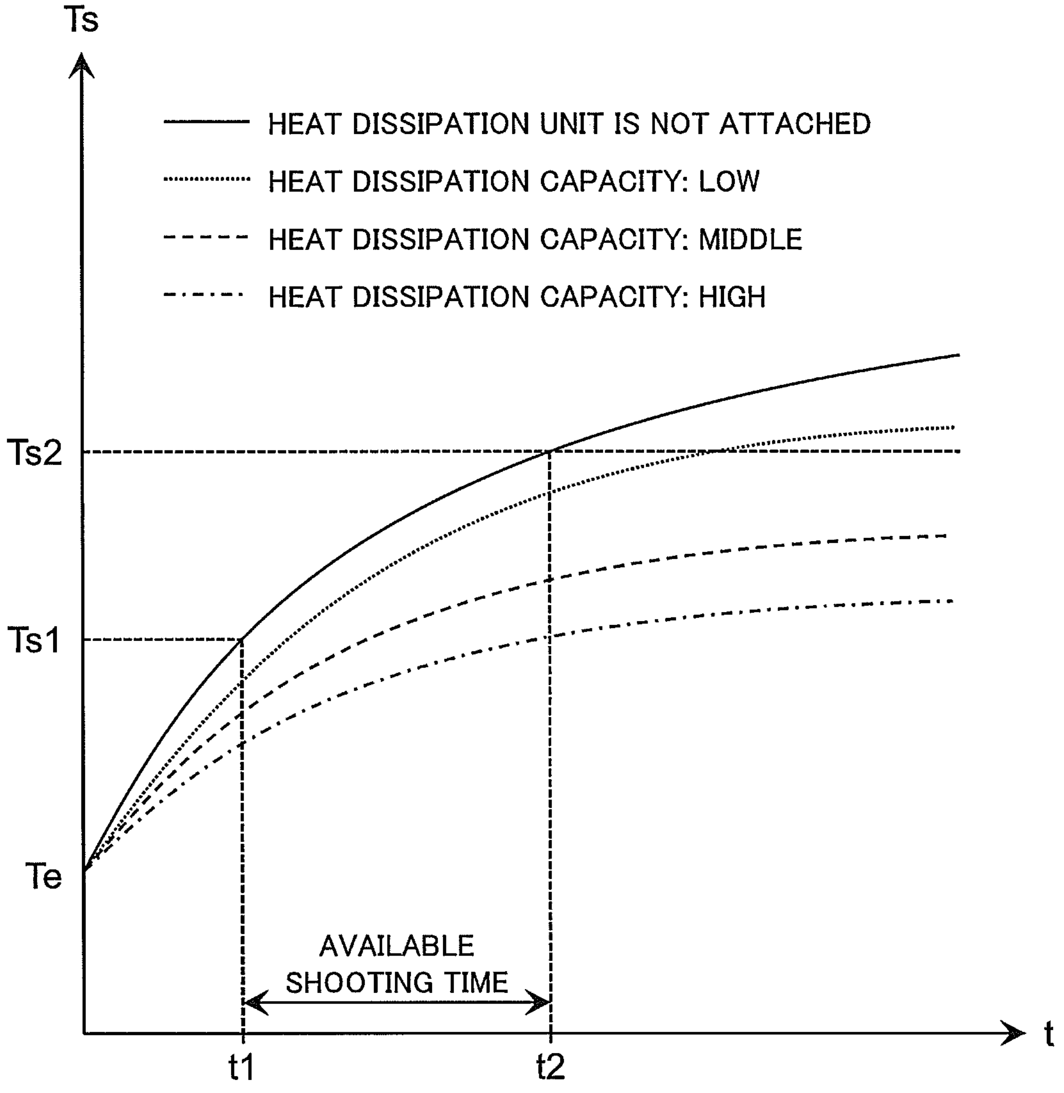
FIG. 20 is a graph illustrating temperature curve data according to a modification of an embodiment.

Hereinafter, an example of a method for calculating the available shooting time based on the temperature curve data or the graph as described above will be described. FIG. 20 is a graph illustrating temperature curve data according to the second modification. In the graph in FIG. 20, the temperature curve data when the heat dissipation unit is not attached is represented by a solid line, and pieces of the temperature curve data when the heat dissipation units having heat dissipation capacities of "low", "medium", and "high" are attached are respectively represented by a dotted line, a broken line, and an alternate long and short dash line. For example, the flash memory 145 stores temperature curve data as shown in FIG. 14 for each shooting mode (for example, 4K30P, 4K60P, 4K120P, and the like).

The graph in FIG. 20 shows a situation in which the sensor temperature Ts rises with the lapse of time when the shooting of the moving image is started. Based on the sensor temperature Ts1 measured by the temperature sensor 165 at a certain time t1, the controller 135 can obtain the time (t2−t1) until the time t2 at which the sensor temperature reaches the thermal stop temperature Ts2 when the shooting of the moving image is continued as the available shooting time. FIG. 20 illustrates such an available shooting time with respect to a solid line graph corresponding to a situation where the heat dissipation unit is not attached.

4-3. Third Modification

In the first and second embodiments and the modifications described above, an example in which the display indicating various types of information is displayed on the display 130 has been described, but the method for notifying the user of these types of information is not limited to the display. For example, the controller 135 may cause a voice output apparatus provided in the digital camera 100 to output a voice indicating these pieces of information.

4-4. Fourth Modification

In the first embodiment, the fan 180*b* including the power supply is exemplified. However, the fan 180*b* may not include a power source, and may receive power supply from an internal battery of the digital camera 100, an external battery outside the digital camera 100, or an external power source.

In particular, when an external battery, an external power source, or a power source included in the fan 180*b* is adopted, the remaining capacity of the internal battery of the digital camera 100 does not decrease even when a large amount of electric power is consumed to increase the heat dissipation capacity of the fan 180*b*. Therefore, it is possible to reduce the possibility of the occurrence of a situation in which the shooting time of the moving image by the digital camera 100 is reduced.

4-5. Fifth Modification

In the first embodiment, the digital camera 100 that does not incorporate the fan or the Peltier element is exemplified, but the present disclosure is also applicable to a digital camera that incorporates at least one of the fan or the Peltier element.

5. Example of Aspects

Hereinafter, various aspects according to the present disclosure will be listed.

<Aspect 1>

An imaging apparatus comprising:

an image sensor configured to shoot a subject image through an optical system and generate image data;

a connector configured to detachably attach a heat dissipation unit;

a controller configured to detect whether the heat dissipation unit is attached to the connector; and a notification unit configured to notify a user of information, wherein the controller causes the notification unit to notify an available shooting time of a moving image according to whether the heat dissipation unit is attached to the connector.

<Aspect 2>

The imaging apparatus, wherein when detecting that the heat dissipation unit is not attached to the connector, the controller causes the notification unit to notify a time during which the imaging apparatus can shoot the moving image in a state where the heat dissipation unit is attached to the connector as the available shooting time.

<Aspect 3>

The imaging apparatus, wherein when detecting that the heat dissipation unit is not attached to the connector, the controller causes the notification unit to notify a time during which the imaging apparatus can shoot the moving image in a state where the heat dissipation unit is not attached to the connector as the available shooting time.

<Aspect 4>

The imaging apparatus, wherein the connector detachably attaches one heat dissipation unit of a plurality of heat dissipation units, the one heat dissipation unit is replaceable with another heat dissipation unit of the plurality of heat dissipation units by attachment and detachment, and when detecting that one of the plurality of heat dissipation units is attached to the connector, the controller causes the notification unit to notify a time during which the imaging apparatus can shoot the moving image in a state where another heat dissipation unit of the plurality of heat dissipation units is attached to the connector as the available shooting time.

<Aspect 5>

The imaging apparatus, further comprising a first temperature sensor configured to measure a temperature of the image sensor, wherein the controller determines the available shooting time based on a temperature of the image sensor measured by the first temperature sensor.

<Aspect 6>

The imaging apparatus, further comprising a second temperature sensor configured to measure an environmental temperature of a surrounding environment of the imaging apparatus, wherein the controller determines the available shooting time further based on the environmental temperature measured by the second temperature sensor.

<Aspect 7>

The imaging apparatus, wherein the controller is operable in one shooting mode selected from among a plurality of shooting modes and determines the available shooting time further based on the selected shooting mode.

<Aspect 8>

The imaging apparatus, wherein the connector detachably attaches one heat dissipation unit of a plurality of heat dissipation units, the one heat dissipation unit is replaceable with another heat dissipation unit of the plurality of heat dissipation units by attachment and detachment, and the controller:

detects heat dissipation capacity of a heat dissipation unit attached to the connector, and determines the available shooting time based on the detected heat dissipation capacity of the heat dissipation unit.

<Aspect 9>

The imaging apparatus, wherein the heat dissipation unit has identification information indicating a heat dissipation method and the heat dissipation capacity or has a structure corresponding to the identification information.

<Aspect 10>

The imaging apparatus, wherein the heat dissipation method of the heat dissipation unit includes a first type in which the heat dissipation capacity is fixed and a second type in which the heat dissipation capacity is changeable.

<Aspect 11>

The imaging apparatus, wherein when predicting that an actual shooting time of the moving image becomes shorter than the available shooting time during shooting of the moving image, the controller causes the notification unit to notify information indicating that the actual shooting time is shorter than the available shooting time.

<Aspect 12>

The imaging apparatus, wherein when predicting that the actual shooting time becomes shorter than the available shooting time during shooting of the moving image, the controller makes the actual shooting time close to or coincide with the available shooting time by increasing heat dissipation capacity of the heat dissipation unit.

<Aspect 13>

The imaging apparatus, wherein the notification unit is a display, and when determining that it is possible to make the actual shooting time close to the available shooting time by increasing the heat dissipation capacity of the heat dissipation unit, the controller causes the display to display a first display.

<Aspect 14>

The imaging apparatus, wherein the notification unit is a display, and when determining that it is possible to make the actual shooting time coincide with the available shooting time by increasing the heat dissipation capacity of the heat dissipation unit, the controller causes the display to display a second display.

<Aspect 15>

The imaging apparatus, wherein the notification unit is a display, and when, during shooting of the moving image, predicting that the actual shooting time becomes shorter than the available shooting time, and determining that it is impossible to make the actual shooting time close to or coincide with the available shooting time by increasing heat dissipation capacity of the heat dissipation unit, the controller causes the display to display a third display.

<Aspect 16>

An imaging apparatus comprising:

an image sensor configured to shoot a subject image through an optical system and generate image data;

a connector configured to detachably attach a heat dissipation unit;

a controller configured to detect whether the heat dissipation unit is attached to the connector;

a notification unit configured to notify a user of information; and an operation member configured to receive a user operation of specifying a shooting time of a moving image desired by the user, wherein when the shooting time is specified through the operation member, the controller causes the notification unit to notify information indicating at least one of a shooting mode that enables shooting of the moving image over the shooting time or the heat dissipation unit.

<Aspect 17>

The imaging apparatus, wherein when the shooting time is specified through the operation member, the controller causes the notification unit to notify a combination of the shooting mode that enables shooting of the moving image over the shooting time and the heat dissipation unit.

<Aspect 18>

The imaging apparatus, wherein when a shooting mode or a heat dissipation unit different from at least one of the shooting mode or the heat dissipation unit notified by the notification unit is specified through the operation member, the controller causes the notification unit to notify warning information.

<Aspect 19>

The imaging apparatus, wherein the notification unit is a display.

The present disclosure is applicable to various imaging apparatuses.

What is claimed is:

1. An imaging apparatus comprising:

an image sensor configured to shoot a subject image through an optical system and generate image data;

a connector configured to detachably attach a heat dissipation unit;

a controller configured to detect whether the heat dissipation unit is attached to the connector; and a notification unit configured to notify a user of information, wherein the controller causes the notification unit to notify an available shooting time of a moving image according to whether the heat dissipation unit is attached to the connector.

2. The imaging apparatus according to claim 1, wherein when detecting that the heat dissipation unit is not attached to the connector, the controller causes the notification unit to notify a time during which the imaging apparatus can shoot the moving image in a state where the heat dissipation unit is attached to the connector as the available shooting time.

3. The imaging apparatus according to claim 2, wherein when detecting that the heat dissipation unit is not attached to the connector, the controller causes the notification unit to notify a time during which the imaging apparatus can shoot the moving image in a state where the heat dissipation unit is not attached to the connector as the available shooting time.

4. The imaging apparatus according to claim 1, wherein the connector detachably attaches one heat dissipation unit of a plurality of heat dissipation units, the one heat dissipation unit is replaceable with another heat dissipation unit of the plurality of heat dissipation units by attachment and detachment, and when detecting that one of the plurality of heat dissipation units is attached to the connector, the controller causes the notification unit to notify a time during which the imaging apparatus can shoot the moving image in a state where another heat dissipation unit of the plurality of heat dissipation units is attached to the connector as the available shooting time.

5. The imaging apparatus according to claim 1, further comprising a first temperature sensor configured to measure a temperature of the image sensor, wherein the controller determines the available shooting time based on a temperature of the image sensor measured by the first temperature sensor.

6. The imaging apparatus according to claim 5, further comprising a second temperature sensor configured to measure an environmental temperature of a surrounding environment of the imaging apparatus, wherein the controller determines the available shooting time further based on the environmental temperature measured by the second temperature sensor.

7. The imaging apparatus according to claim 5, wherein the controller is operable in one shooting mode selected from among a plurality of shooting modes and determines the available shooting time further based on the selected shooting mode.

8. The imaging apparatus according to claim 1, wherein the connector detachably attaches one heat dissipation unit of a plurality of heat dissipation units, the one heat dissipation unit is replaceable with another heat dissipation unit of the plurality of heat dissipation units by attachment and detachment, and the controller:

detects heat dissipation capacity of a heat dissipation unit attached to the connector, and determines the available shooting time based on the detected heat dissipation capacity of the heat dissipation unit.

9. The imaging apparatus according to claim 8, wherein the heat dissipation unit has identification information indicating a heat dissipation method and the heat dissipation capacity or has a structure corresponding to the identification information.

10. The imaging apparatus according to claim 9, wherein the heat dissipation method of the heat dissipation unit includes a first type in which the heat dissipation capacity is fixed and a second type in which the heat dissipation capacity is changeable.

11. The imaging apparatus according to claim 1, wherein when predicting that an actual shooting time of the moving image becomes shorter than the available shooting time during shooting of the moving image, the controller causes the notification unit to notify information indicating that the actual shooting time is shorter than the available shooting time.

12. The imaging apparatus according to claim 11, wherein when predicting that the actual shooting time becomes shorter than the available shooting time during shooting of the moving image, the controller makes the actual shooting time close to or coincide with the available shooting time by increasing heat dissipation capacity of the heat dissipation unit.

13. The imaging apparatus according to claim 12, wherein the notification unit is a display, and when determining that it is possible to make the actual shooting time close to the available shooting time by increasing the heat dissipation capacity of the heat dissipation unit, the controller causes the display to display a first display.

14. The imaging apparatus according to claim 12, wherein the notification unit is a display, and when determining that it is possible to make the actual shooting time coincide with the available shooting time by increasing the heat dissipation capacity of the heat dissipation unit, the controller causes the display to display a second display.

15. The imaging apparatus according to claim 11, wherein the notification unit is a display, and when, during shooting of the moving image, predicting that the actual shooting time becomes shorter than the available shooting time, and determining that it is impossible to make the actual shooting time close to or coincide with the available shooting time by increasing heat dissipation capacity of the heat dissipation unit, the controller causes the display to display a third display.

* * * * *